United States Patent [19]

Sugimoto

[11] Patent Number: 5,847,697
[45] Date of Patent: Dec. 8, 1998

[54] SINGLE-HANDED KEYBOARD HAVING KEYS WITH MULTIPLE CHARACTERS AND CHARACTER AMBIGUITY RESOLUTION LOGIC

[75] Inventor: Masakatsu Sugimoto, Tokyo, Japan

[73] Assignee: Fujitsu Limited, Japan

[21] Appl. No.: 382,781

[22] Filed: Jan. 31, 1995

[51] Int. Cl.[6] .................................................. G06F 3/023
[52] U.S. Cl. ............................ 345/168; 400/489; 341/22
[58] Field of Search .................................... 345/168, 171; 364/709.11, 709.12, 709.15; 400/489, 485–486, 477, 472; 341/22, 23

[56] References Cited

U.S. PATENT DOCUMENTS

| | | | |
|---|---|---|---|
| 2,040,248 | 5/1936 | Dvorak et al. | 400/486 |
| 4,042,777 | 8/1977 | Bequaert et al. | 178/79 |
| 4,360,892 | 11/1982 | Endfield | 707/534 |
| 4,484,305 | 11/1984 | Ho | 707/535 |
| 4,555,193 | 11/1985 | Stone | 400/486 |
| 4,602,878 | 7/1986 | Merner et al. | 400/110 |
| 4,650,927 | 3/1987 | James | 379/93.18 |
| 4,677,659 | 6/1987 | Dargan | 379/93.27 |
| 4,684,926 | 8/1987 | Yong-Min | 341/28 |
| 4,694,280 | 9/1987 | Rollhaus et al. | 341/26 |
| 4,761,522 | 8/1988 | Allen | 200/5 R |
| 4,773,009 | 9/1988 | Kucera et al. | 707/531 |
| 4,775,255 | 10/1988 | Langley | 400/485 |
| 4,823,294 | 4/1989 | Rouhani | 364/709.12 |
| 4,836,700 | 6/1989 | Jensen | 400/489 |
| 4,846,598 | 7/1989 | Livits | 400/472 |
| 4,891,777 | 1/1990 | Lapeyre | 364/706 |
| 4,954,955 | 9/1990 | Chiu | 341/22 |
| 4,994,992 | 2/1991 | Lapeyre | 364/709.15 |
| 5,003,503 | 3/1991 | Lapeyre | 364/710.12 |
| 5,006,001 | 4/1991 | Vulcano | 400/486 |
| 5,059,048 | 10/1991 | Sirkin | 400/486 |
| 5,062,070 | 10/1991 | Lapeyre | 364/709.16 |
| 5,131,766 | 7/1992 | Wong | 400/110 |
| 5,175,803 | 12/1992 | Yeh | 707/535 |
| 5,197,811 | 3/1993 | Levinrad | 400/489 |
| 5,200,988 | 4/1993 | Riskin | 379/52 |
| 5,228,791 | 7/1993 | Fort | 400/489 |
| 5,251,163 | 10/1993 | Rouhani | 364/709.12 |
| 5,288,158 | 2/1994 | Matias | 400/472 |
| 5,289,394 | 2/1994 | Lapeyre | 364/709.12 |
| 5,336,002 | 8/1994 | Russo | 400/489 |
| 5,367,298 | 11/1994 | Axthelm | 341/22 |
| 5,424,728 | 6/1995 | Goldstein | 341/22 |
| 5,535,421 | 7/1996 | Weinrich | 395/887 |
| 5,543,790 | 8/1996 | Goldstein | 341/22 |

FOREIGN PATENT DOCUMENTS

| | | |
|---|---|---|
| 0319193A2 | 6/1989 | European Pat. Off. . |
| 0602821A2 | 6/1994 | European Pat. Off. . |
| 2266797 | 11/1993 | United Kingdom . |
| 2283598 | 5/1995 | United Kingdom . |

OTHER PUBLICATIONS

Search Reports and cover letter dated Jun. 5, 1996 regarding Application No. GB 9601870.0 from the U.K. Patent Office, Mike Davis, Examiner (Date of Search Jun. 4, 1996), 10 pages.

*Primary Examiner*—Matthew M. Kim
*Assistant Examiner*—Crescelle N. dela Torre
*Attorney, Agent, or Firm*—Christie, Parker & Hale, LLP

[57] ABSTRACT

A character generator for a keyboard where the keyboard has keys for entry of characters. Each key is assigned a character and each of at least some of the keys are multiple-character keys assigned multiple characters. The character generator includes a generator for generating one of the characters assigned to each of a sequence of character keys that are entered on the keyboard, there being an ambiguity as to the correct character to be generated when any multiple-character key is entered in the sequence of keys. An ambiguity resolver operates in response to the sequence of character keys that have been entered for resolving the correct character for any of the multiple-character keys in the sequence of keys that are entered.

34 Claims, 27 Drawing Sheets

FIG. 14

```
           100          101         102
            \            \           \
     ┌ ─ ─ ─ ─\─ ─ ─ ─ ─ ─\─ ─ ─ ─ ─ ─\─ ─ ─ ─ ─ ┐
     │   a_sh_dict  ($arodnd$,$around$) .        │
     │   a_sh_dict  ($arodoe$,$arouse$) .        │
     │   a_sh_dict  ($arrante$,$arrange$) .      │
     │   a_sh_dict  ($arrantement$,$arrangement$) . │
     │   a_sh_dict  ($arram$,$array$) .          │
     │   a_sh_dict  ($arreot$,$arrest$) .        │
     │   a_sh_dict  ($arrilal$,$arrival$) .      │
     │   a_sh_dict  ($arrile$,$arrive$) .        │
     │   a_ah_dict  ($arrotanre$,$arrogance$) .  │
     │   a_sh_dict  ($arrotant$,$arrogant$) .    │
     │   a_sh_dict  ($arroj$,$arrow$) .          │
     │   a_sh_dict  ($art$,$art$) .              │
     │   a_sh_dict  ($arterm$,$artery$) .        │
     │   a_sh_dict  ($artirle$,$article$) .      │
     │   a_sh_dict  ($artirdlate$,$articulate$) . │
     │   a_sh_dict  ($artifirial$,$artificial$) . │
     │   a_sh_dict  ($artiot$,$artist$) .        │
     │   a_sh_dict  ($artiotir$,$artistic$) .    │
     │   a_sh_dict  ($ao$,$as$) .                │
     │   a_sh_dict  ($aorend$,$ascend$) .        │
     │   a_sh_dict  ($aorent$,$ascent$) .        │
     │   a_sh_dict  ($aorertain$,$ascribe$) .    │
     │   a_sh_dict  ($aoi$,$ash$) .              │
     │   a_sh_dict  ($aoime$,$ashame$) .         │
     │   a_sh_dict  ($aiode$,$aside$) .          │
     │   a_sh_dict  ($aok$,$ask$) .              │
     │   a_sh_dict  ($aoleen$,$asleep$) .        │
     │   a_sh_dict  ($aonert$,$aspect$) .        │
     │   a_sh_dict  ($aonire$,$aspire$) .        │
     │   a_sh_dict  ($aoooadlt$,$assault$) .     │
     └ ─ ─ ─ ─ ─ ─ ─ ─ ─ ─ ─ ─ ─ ─ ─ ─ ─ ─ ─ ─ ─ ┘
```

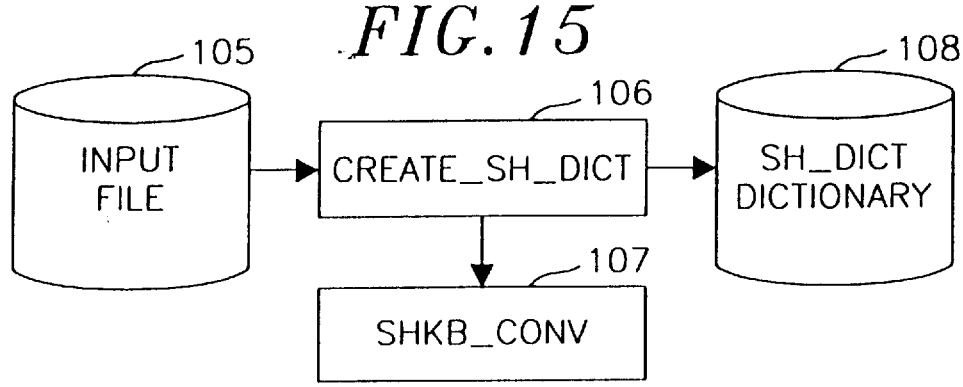
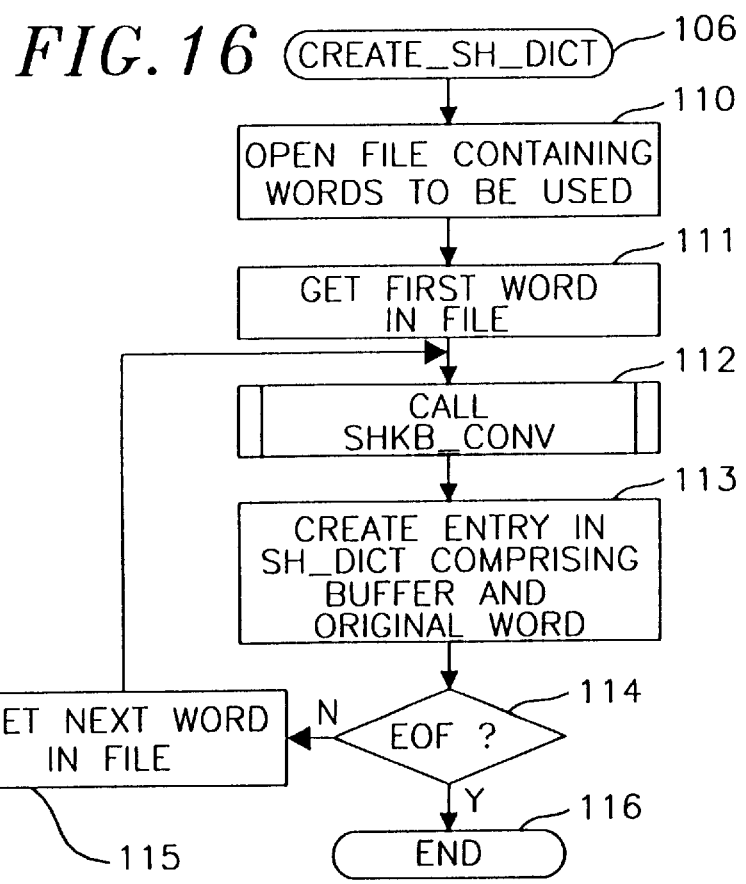

184 185

```
dict( $York$,[$York$,$mock$] ) .
dict( $accent$,[$accent$,$accept$] ) .
dict( $act$,[$act$,$art$] ) .
dict( $age$,[$age$,$ate$] ) .
dict( $alert$,[$alert$,$avert$] ) .
dict( $ant$,[$ant$,$apt$] ) .
dict( $back$,[$back$,$bark$] ) .
dict( $bag$,[$bag$,$bat$] ) .
dict( $beg$,[$beg$,$bet$] ) .
dict( $big$,[$big$,$bit$] ) .
dict( $bigger$,[$bigger$,$bitter$] ) .
dict( $bouy$,[$bouy$,$busy$] ) .
dict( $cage$,[$cage$,$rage$,$rate$] ) .
dict( $cam$,[$cam$,$RAM$,$ram$,$ray$] ) .
dict( $camp$,[$camp$,$rayn$] ) .
dict( $can$,[$can$,$cap$,$ran$] ) .
```

```
dict( $back$,$back$ ) .
dict( $back$,$bark$ ) .
dict( $bag$,$bag$ ) .
dict( $bag$,$bat$ ) .
dict( $beg$,$beg$ ) .
dict( $beg$,$bet$ ) .
dict( $big$,$big$ ) .
dict( $big$,$bit$ ) .
dict( $cage$,$cage$ ) .
dict( $cage$,$rage$ ) .
dict( $cage$,$rate$ ) .
dict( $can$,$can$ ) .
dict( $can$,$cap$ ) .
dict( $can$,$ran$ ) .
```

*FIG. 18b*

SINGLE-HANDED KEYBOARD HAVING KEYS WITH MULTIPLE CHARACTERS AND CHARACTER AMBIGUITY RESOLUTION LOGIC

FIELD OF THE INVENTION

The present invention relates in general to data entry systems and in particular to keyboards that have multicharacter keys.

REFERENCE TO APPENDIX

A microfiche appendix is part of this specification. The microfiche appendix includes 4 microfiches and 173 frames.

A portion of the disclosure of this patent document contains material to which a claim for copyright is made. The copyright owner has no objection to the facsimile reproduction by anyone of the patent document or patent disclosure, as it appears in the Patent and Trademark Office patent file or records, but reserves all other copyright rights whatsoever.

BACKGROUND OF THE INVENTION

Recently, laptop, notebook and palm-top computers have become increasingly popular, in large part because they are extremely portable and can be easily carried to the office, home, and abroad. At the same time, the keyboards for these computers have become smaller in size. For example, a typical full-sized keyboard is approximately 18 inches wide and 7 inches deep, such as a Fujitsu Model FKD4870 keyboard. By comparison, the average palm-top computer is under ten inches wide by four inches deep in total outward dimension, including keyboard, chassis and display assembly, such as a Fujitsu Poget PC Plus Prolinear PS1000 palm-top computer. The limiting factor in downsizing these keyboards is the size of the average human hand. As computers continue to decrease in size, the problem of applying normal touch-typing skills to their cramped dimensions increases. A solution is to create a keyboard that incorporates all the functionality of a full-sized keyboard yet can be efficiently used with a single hand. The problem with this approach is that multiple keys must be configured as having more than one character, number, or function to cover the many characters, numbers, and functions that the user requires.

Full keyboards are designed with 26 alphabetic character keys corresponding to each character in the Roman alphabet. After the addition of numeric, function, and other ancillary keys, the number of keys substantially increases. For instance, the Fujitsu Model FKB4870 keyboard has 101 keys.

Reducing the number of keys to fewer than 20 keys makes it possible to create a keyboard usable by a single hand. However, designing a keyboard with fewer than 26 alphabetic character keys also creates the problem of assigning two or more alphabetic characters per key. It further introduces the problem of having to resolve ambiguities as to which of the two or more alphabetic characters is being selected whenever such a multicharacter key is used.

A solution is to use a thumb key to allow the user to select among several alphabetic characters assigned to a multicharacter key. U.S. Pat. No. 4,360,892 to Endfield discloses a portable word processor having a single-hand keyboard with finger and thumb keys. These keys are entered in chords to enter a character, number, or punctuation mark but the thumb keys are not used to select a particular character once the operator has chosen a keyboard by using one of the thumb keys.

U.S. Pat. No. 4,042,777 to Bequaert et al. discloses a single-hand keyboard with finger and thumb keys. The operator presses thumb keys to select an alphabet or case and can press up to four finger keys with one finger to uniquely identify a character within the alphabet or case. The operator does not press thumb keys to select a particular character once he has chosen the alphabet or case.

U.S. Pat. No. 5,288,158 to Mathias discloses a single-hand keyboard that comprises keys for representing one-half of a full keyboard. The finger keys are used to key in two characters, one from each half of the full keyboard. The operator presses a modifier key with his thumb to choose between the two halves of the keyboard. A problem with the '892, '777, and '158 patents is that the user must decide whether to use the thumb key for most keystrokes.

Another solution to the problem of distinguishing between two or more alphabetic characters entered using a multicharacter key is to resolve ambiguities post hoc. U.S. Pat. No. 4,484,305 to Ho discloses a phonetic word processor that enables a user to enter Chinese, Japanese, or other ideographic characters using a standard QWERTY keyboard. The user selects the three parts, consonants vowels and tones, comprising a word. An ideographic character along with any characters having the same sound (homonyms) is displayed on the screen.

U.S. Pat. No. 4,684,926 to Yong-Min discloses a system of encoding Chinese characters that includes a keyboard comprising an arrangement of basic strokes constituting roots of Chinese characters and phrases encoded according to their geometric forms. The user toggles between characters having the same encoding. A problem with the approach taken in the '305 and '926 patents is that the system enables the resolution of ambiguity between individual ideographic characters or homonyms but not between multiple-character words.

Accordingly, there is a need for a keyboard that resolves ambiguities between multiple-characters assigned to the name key when a sequence of keys is entered and preferably to one that does so from a single handed keyboard that has more than one character assigned per key. There is also a need for a keyboard that has keys layed out and placed in the keyboard for the most efficient entry by the fingers of a single hand.

SUMMARY OF THE INVENTION

An embodiment of the present invention is a keyboard for operation by fingers of a single hand of a person. Character keys, each of which when operated enables generation of an assigned character. A first bank of the keys has at least one key assigned the characters n and p and at least one key assigned the characters t and g disposed for operation by the index finger, at least one key assigned the characters r and c disposed for operation by the middle finger, at least one key assigned the characters k and z disposed for operation by the ring finger, and at least one key assigned the characters j and w disposed for operation by the little finger of the single hand. A second bank of the keys has at least one key assigned the characters d and u and at least one key assigned the characters f and x disposed for operation by the index finger, at least one key assigned the characters m and y disposed for operation by the middle finger, at least one key assigned the characters l and v disposed for operation by the ring finger, and at least one key assigned the characters b and q disposed for operation by the little finger of the single hand. A middle bank of the keys between the first and second banks has at least one key assigned the character a and at least one key assigned the character e disposed for operation by the index finger, at least one key assigned the characters i and h disposed for operation by the middle finger, and at least one key assigned the characters o and s disposed for operation by the ring finger of the single hand.

Preferably, the keyboard has keyboard function keys disposed for operation by a finger of the single hand, and the middle bank further has at least one keyboard function key operable in the keyboard for control of capitalization of the character being generated and disposed for operation by the little finger.

Also preferably, the home bank has at least one keyboard function key disposed for operation by the little finger for causing resolution of the ambiguity between the generated characters when, during operation of a plurality of the keys, at least one of the character keys is operated that is assigned more than one of the characters.

Preferably, the second bank has at least one keyboard function key for entry of a space character between the characters being generated and disposed for operation by the little finger.

Additionally, there is preferably provided a secondary bank of keys disposed for operation by a thumb of the single hand for control of the keyboard.

Preferably, the keys are arranged in substantially parallel rows and diagonal columns. The diagonal columns have a first diagonal column with the keys assigned the characters n, p, a, d and u a second diagonal column with the keys assigned the characters t, g, e, f and x a third diagonal column with the keys assigned the characters r, c, i, h, m and y a fourth diagonal column with the keys assigned the characters k, z, o, s, l and v and a fifth diagonal column with the keys assigned the characters j, w, b and g.

Also preferably, there is a sixth diagonal row with at least one function key disposed for operation by the little finger for causing resolution of the ambiguity between the characters to be so generated when one of the character keys is operated, during operation of a plurality of the keys, that is assigned more than one of the characters.

Preferably, the keyboard has character keys laid out and disposed substantially as shown in FIG. 2 or FIG. 3.

Also, an embodiment of the invention is a keyboard for entering, with the fingers of a single hand, the letters of the alphabet. The keyboard has first, second and middle rows of letter entry keys, the middle row being located between the first and second rows. In the middle row, the letter entry keys are, in sequential order, "a" key, "e" key, "i" and "h" key, and "o" and "s" key. In the first row, the keys are, in sequential order, "n" and "p" key, "g" and "t" key, "c" and "r" key, "z" and "k" key, and "w" and "j" key. In the third row, the keys are, in sequential order, "d" and "u" key, "f" and "x" key, "m" and "y" key, "l" and "v" key, and "b" and "q" key.

Preferably, there is a representation of each of the recited letters displayed in association with the corresponding key, and in a preferred embodiment, each such representation of each letter is on the corresponding key.

In a preferred embodiment, the keys are arranged in substantially parallel rows and diagonal columns. The diagonal columns have a first diagonal column with the n, p, a, d and u keys a second diagonal column with the t, g, e, f and x keys a third diagonal column with the r, c, i, h, m and y keys a fourth diagonal column with the k, z, o, s, l and v keys and a fifth diagonal column with the j, w, b and q keys.

Also preferably, the fifth diagonal column and the middle row have a function key for control of the keyboard and a representation "Ar" displayed in association with such control key.

An embodiment of the invention is also a character generator for a keyboard where the keyboard has keys for entry of the characters. Each key is assigned a character and each of at least some of said keys are multiple-character keys assigned multiple characters. The generator generates one of the characters assigned to each of a sequence of the character keys that are entered on the keyboard, there being an ambiguity as to the correct character to be generated when any said multiple-character key is entered in the sequence of keys. An ambiguity resolver operates based on the sequence of character keys that have been entered for resolving the correct character for any of the multiple-character keys in the sequence of keys that are entered.

Also, an embodiment of the invention is a keyboard character entry system having keys each assigned a character, the keys include multiple-character keys each assigned multiple characters. A character generator generates, upon entry of a sequence of the keys, a sequence of the characters including a character assigned to each of the sequence of the keys, there being an ambiguity among the multiple characters assigned to a multiple-character key that is entered as to the correct assigned character that should be included in the sequence of characters. A multiple-character resolver is responsive to the sequence of keys that are entered for resolving the ambiguity.

A further embodiment of the invention is a method for generating character sequences using a character generator for a keyboard where the keyboard has keys for entry of assigned characters. Each of at least some of said keys is a multiple-character key assigned multiple characters. The generator is used for generating one of the characters assigned to each of a sequence of the character keys that are entered on the keyboard. There is an ambiguity as to the correct character to be generated when any multiple-character key is entered in the sequence of keys. Based on the sequence of character keys that have been entered, a resolution is made as to the correct character for any of the multiple-character keys in the sequence of keys that are entered.

Still other embodiments of the present invention will become readily apparent to those skilled in the art from the following detailed description, wherein is shown and described only the preferred embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

BRIEF DESCRIPTION OF THE DRAWINGS

Examples of the invention will now be described with reference to the accompanying drawings, of which:

FIG. 14 is a diagram depicting the structure of the SH_DICT dictionary of FIG. 8;

FIG. 15 is a block diagram showing the process for creating the SH_DICT dictionary of FIG. 8;

FIG. 16 is a flow diagram of the CREATE_SH_DICT routine of FIG. 15;

FIGS. 18a and 18b are depict diagrams showing the structure of the DICT dictionary, a preferred embodiment being shown in FIG. 18a and an alternate embodiment being shown in FIG. 18b;

DETAILED DESCRIPTION OF THE PREFERRED EMBODIMENT

Figure 26:
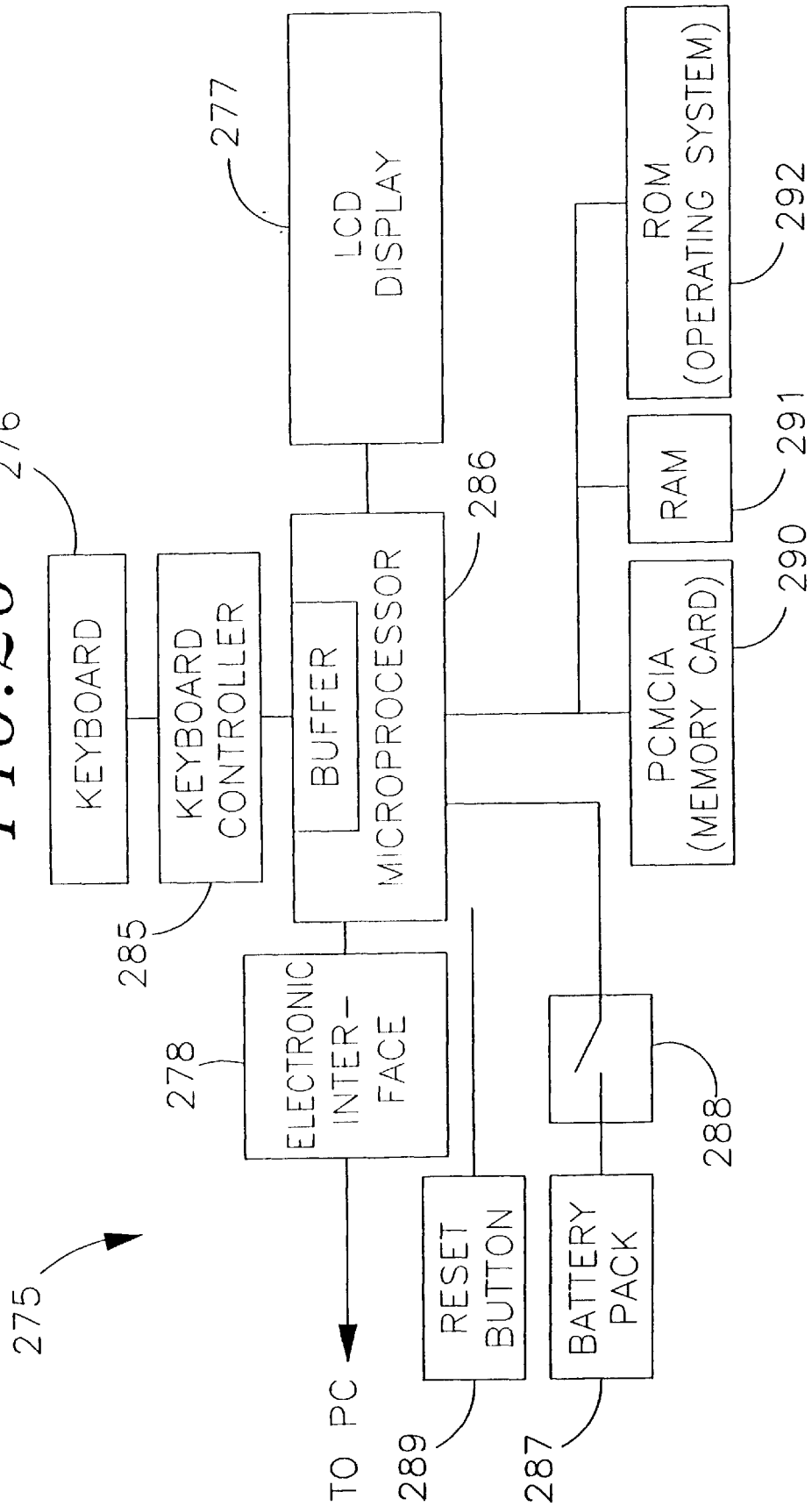
FIG. 26 is a schematic block diagram depicting the electronic components for a single-hand keyboard systems, including a programmed computer or processor.

An embodiment of the present invention is a keyboard system such as depicted in FIG. 26. A keyboard 276 with keys and keyswitches (not shown) sends binary coded digital signals representative of each key that is struck or entered to a keyboard controller 285. Keyboard controller 285, in turn, sends signals unique to the keys which have been entered to a digital computer or microprocessor 286. The microprocessor 286, under control of a computer program, recognizes the entered keys and forms or generates a character or symbol assigned to the keys that have been entered in the form of digital coded signals. A visual display of the character or symbol is also formed on a visual display 277.

Although an embodiment of the invention is useful for conventional two-handed keyboards, it is especially useful for a single-hand keyboard. The discussion to follow is presented in three sections covering the spatial arrangement of the keys, the ambiguity resolution logic and the software emulator and hardware embodiments.

I. Spatial Arrangement of Keys

Figure 1:
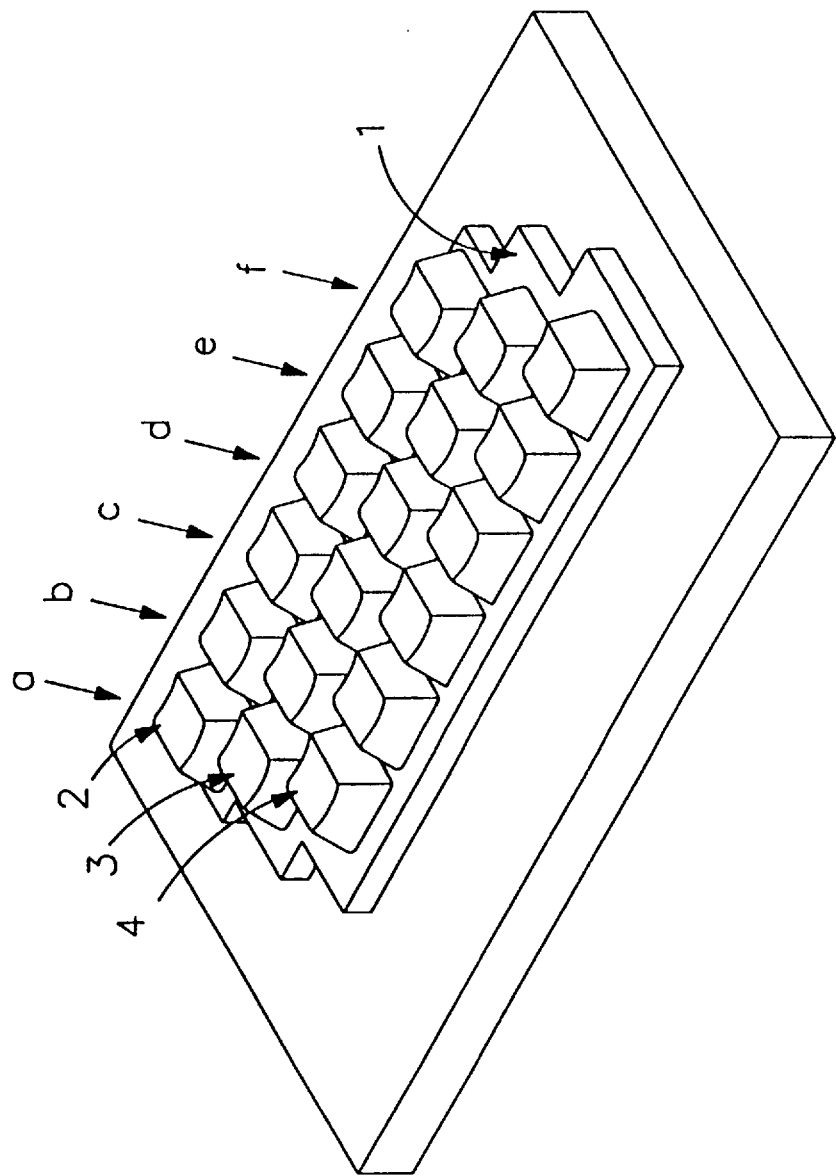
FIG. 1 depicts an isometric view of a single-hand keyboard, including a character generator, with no thumb keys and embodies the present invention.
Figure 2:
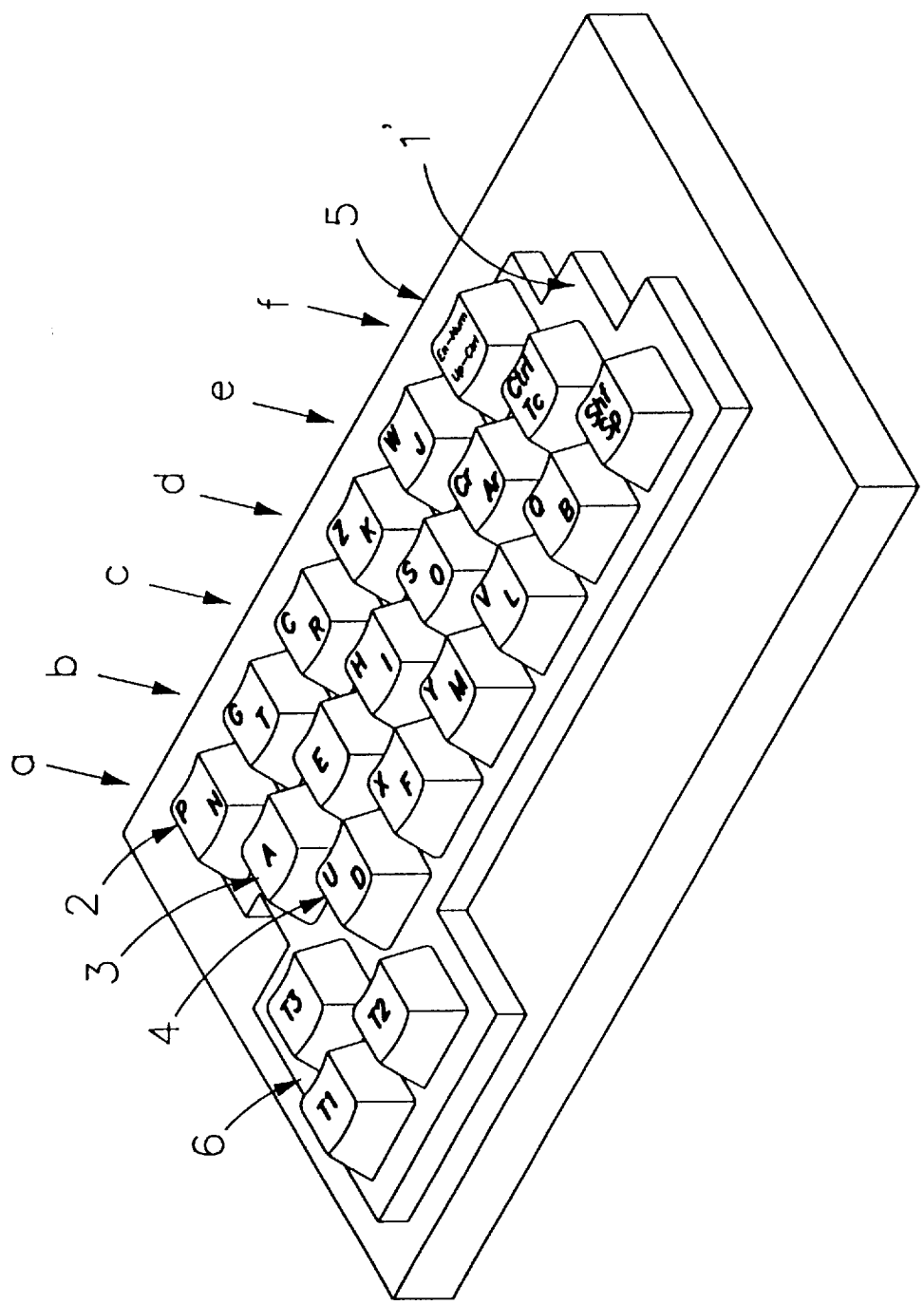
FIG. 2 is an isometric view of a single-hand keyboard, including a character generator, having a key layout for a right-handed single-hand keyboard with thumb keys and embodies the present invention.
Figure 3:
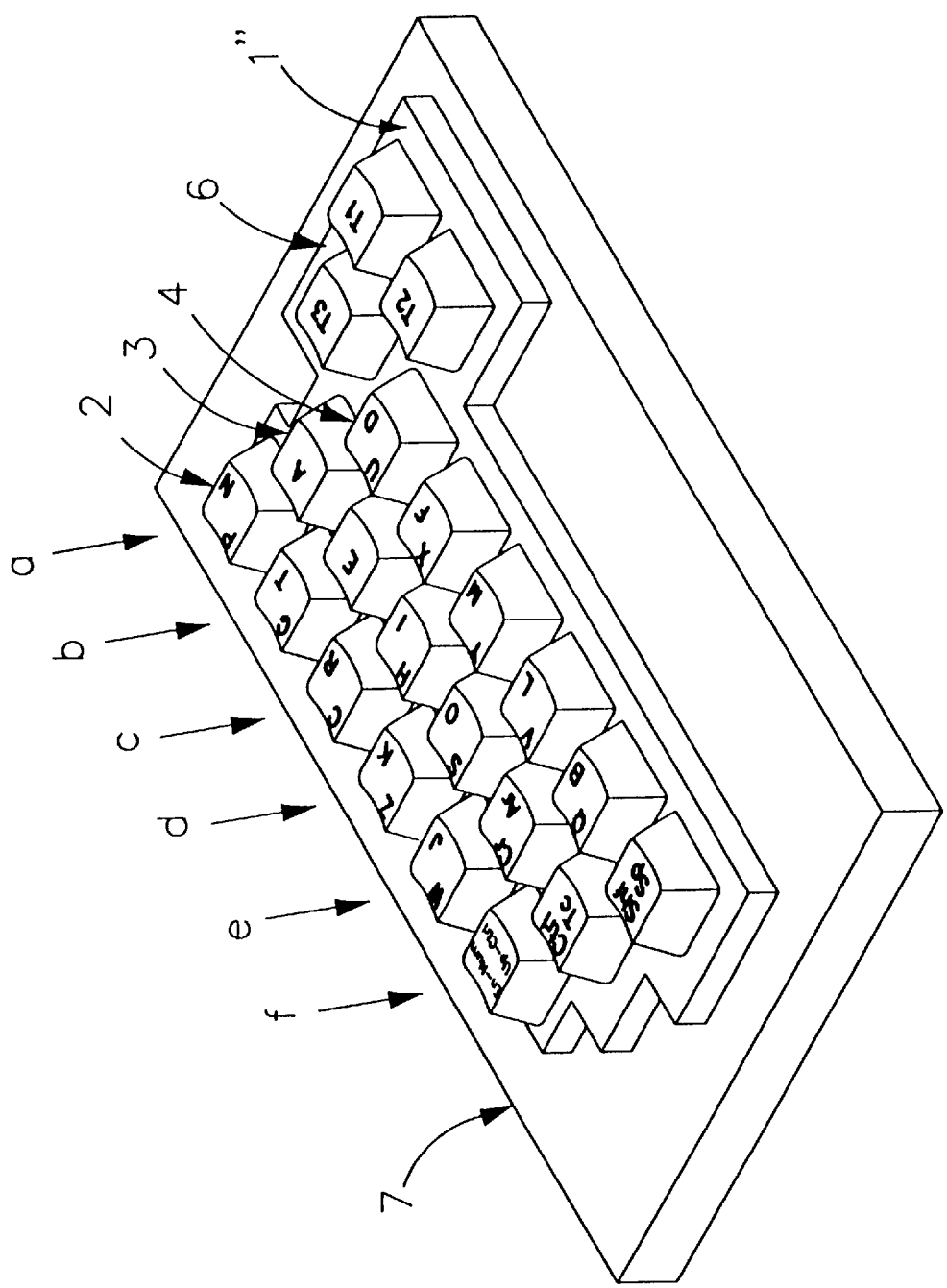
FIG. 3 is an isometric view of a single-hand keyboard, including a character generator, having a key layout for a left-handed single-hand keyboard with thumb keys and embodies the present invention.

Referring to FIGS. 1, 2 and 3, three different single-hand keyboards are illustrated. FIG. 1 shows the general layout of a right-handed single-hand keyboard 1 comprising a keypad 1 having an upper row 2, a home row 3, and a lower row 4 of finger keys, forming first, middle and second rows of keys. By way of example, there are six finger keys per row for a total of 18 finger keys. The keys in rows 2, 3 and 4 are character keys arranged in columns a, b, c, d, e and f. Columns a through e have keys each assigned for generating one or more characters. An exception is the key in row 3 of column f, which is a function key. The keys in column f of each row are function keys for controlling keyboard functions. A bank of three thumb keys are included in the embodiments of FIGS. 2 and 3 but not of FIG. 1. The embodiments of FIGS. 2 and 3 also have a bank of thumb keys 6.

The keyboard can be configured with either right-hand keypad 1' as in FIG. 2 or left-hand keypad 1" as in FIG. 3, and the specific key layout for one is preferably a mirror image of the other. Referring to FIG. 2, right-handed single-hand keyboard 5 is shown with three right-hand thumb keys 6.

A. Assignment of Keys

FIGS. 2 and 3 are labelled to show characters and the control and functions assigned to each key for the right-handed single-hand keyboard 5. The functionality, layout of components, and operation of the right-handed single-hand keyboard 5 and the left-handed single-hand keyboard 7 are essentially the same and therefore the description of one will be understood to apply equally to the other. The thumb keys 6 function in a manner similar to conventional shift keys. Each character key has a primary character assigned to it. Some finger keys have a second alternate character or special function assigned to it. Thumb keys are depressed simultaneously with a finger key to access an alternate character or to execute a special function.

In FIG. 2, the 26 characters of the Roman alphabet are shown assigned to 14 finger keys in columns a–f of rows 2, 3 and 4 with only two of those characters being assigned to a single key. Those are the keys for the characters A and E in columns a and b of row 3. The remaining 12 finger keys are multicharacter keys with two characters assigned to each.

The lower character assigned to and shown on each multi-character key is the primary character which is formed when the user presses that multicharacter key. The upper character of each multicharacter key is an alternate character which is registered when the user simultaneously enters the T2 thumb key and that multicharacter key. Thus, the set of primary characters comprises the characters A, B, D, E, F, I, J, K, L, M, N, O, R, and T. The set of alternate characters comprises the characters C, G, H, P, Q, S, U, V, W, X, Y, and Z. In the following discussion, the finger keys will be referred to by their primary character assignment unless otherwise indicated.

The alphabetic key assignments proceeding from left to right for the right-handed keyboard/right to left for the left-handed keyboard in order of primary/alternate characters, are for the upper row 2: N/P, T/G, R/C, K/Z, and J/W; for the home row 3; A, E, I/H, and O/S; and for the lower row 4; D/U, F/X, M/Y, L/V, and B/Q. Ambiguity resolution logic, to be described, resolves the ambiguity caused by the dual use of each multicharacter key for more than one character.

There are four nonalphabetic finger control keys. In the upper row 2, the right-most key in column f of row 2 is the Up-Ctrl/En-Num key. The primary function assigned is the capitalization control function, Up-Ctrl: Lower case characters are normally generated. The Up-Ctrl key causes upper case or capitalized characters to be generated. The alternate function En-Num causes the keyboard to enter or exit a numeric character entry mode, En-Num, in which strokes of the keys entered cause numerals to be formed instead of alphabetic characters. To access the alternate function, the user simultaneously depresses the T2 thumb key and the Up-Ctrl/En-Num key.

The second key from the right in the home row 3 is the Ar/Cr control key and is the only key in column e that is not a character key. The primary function Ar triggers the ambiguity resolution logic. The alternate function Cr enters a carriage return. To have access to the alternate function, the user simultaneously depresses the T2 thumb key and the Ar/Cr key.

The right-most key, column f of the home row 3, is the Tc/Ctrl key. The primary function Tc, causes formation of a terminal character which is a punctuation mark. The set of available terminal characters is described below. The alternate function Ctrl enables a control function, to be entered. To access the alternate function, the user simultaneously depresses the T2 thumb key and the Tc/Ctrl finger key.

The right-most key in column f, column f of the lower row 4 is the Sp/Shf key. The primary function Sp enters a space. The alternate function Shf enables the user to input special codes such as case shifts and cursor-up movements. To access the alternate function, the user simultaneously depresses the T2 thumb key and the Sp/SHF key.

For ease of use of the single-hand keyboard, the home row key assignments for the right hand are: index finger on the E key, middle finger on the I key, ring finger on the O key, little finger on the Ar key, and thumb on the T2 key.

B. Basis for Alphabetic Character Key Assignments

The assignment of the alphabetic characters to the finger keys comprising the single-handed keyboard is a function of three variables.

The first variable is the frequency of occurrence for each alphabetic character in ordinary English text. The frequency of character occurrences is shown in Table 1 and is detailed in W. A. Beeching, *The Century of the Typewriter*, pp. 41–42 (London 1974).

TABLE 1

Frequency of Appearance for Alphabetic Characters in ordinary English Text

| E | T | A | O | N | R | I |
|---|---|---|---|---|---|---|
| S | H | D | L | F | C | M |
| U | G | Y | P | W | B | V |
| K | X | J | Q | Z |   |   |

Referring to Table 1, the 26 characters of the Roman alphabet are shown in decreasing order of frequency from left to right, top to bottom. Thus, the seven most frequently appearing characters are E, T, A, O, N, R, and I on keys in the middle and upper left of the keyboard of FIG. 2.

The second variable in the assignment of keys in the single-hand keyboard is the relative ease of movement of the fingers. For each finger, ease of movement is defined in terms of three variables: lateral movement, flexion, and extension. Lateral movement refers to the relative ability of a finger to move in a horizontal, left-to-right manner. Accordingly, the index and little fingers enjoy the most lateral movement since both are "outer" fingers. Conversely, the middle and ring fingers have the least lateral movement because both are constrained on either side by other fingers: the index and ring fingers surround the middle finger, and the middle and little fingers surround the ring finger. Consequently, the single-hand keyboard assigns two columns of keys apiece to the ring finger and little finger and one column of keys apiece to the middle and ring fingers.

Flexion refers to the ability of a finger to curl. Normally, all fingers of the hand are equally flexible. Extension refers to the ability of a finger to stretch outwardly. Normally, all fingers are also equally extendable. However, in key layout design, the effects of flexion and extension are affected by finger length. Thus, although the little finger enjoys a greater degree of lateral movement than either the middle or ring finger, it is the least suitable finger for movement away from the home row due to its short length. Moving the little finger away from the home row requires movement of the entire hand, an undesirable side effect. Nevertheless, the little finger is well equipped for timing the movements of fingers and for helping to anchor the other fingers to the home row position. As a result, in the single-hand keyboard, the home row position for the little finger is the Ar key which triggers the ambiguity resolution logic, a frequently used function in the preferred embodiment.

The keyboard of FIG. 2 assigns alphabetic characters in accordance with the relative ease of movement in fingers and the frequency of occurrence of each alphabetic character in ordinary text. Since the index finger enjoys the greatest overall ease of movement, four of the most frequently used characters, A, E, N, and T, are assigned to that finger. In addition, the characters D and F are also assigned to the index finger, though in the lower row positions.

The most frequently used alphabetic character, E, is assigned to the home row position for the index finger. The second most frequently used alphabetic character, T, is assigned to the upper row position of the index finger. The third most frequently used alphabetic character, A, is assigned to the left position of the index finger. Finally, the fifth most frequently used alphabetic character, N, is assigned to the upper left position of the index finger. The fourth most frequently used character, O, is assigned to the home row position for the ring finger. The sixth and seventh most frequently used characters, R and I, are assigned to the upper row and home row positions for the middle finger.

The most frequent run of alphabetic characters is "TION." The key layout places the T, I, and O keys in positions conducive to a more natural flow of finger movement, proceeding from left to right for the right hand, and from right to left for the left hand. Moreover, it is easier to type this sequence of characters if the character I is assigned to a home row position. Thus, although the character R appears more frequently than the character I, the character I appears in the home row position for the middle finger for typing efficiency.

Note that in the preferred embodiment, three of the five vowels in the English language, E, I, and O, are assigned to home row positions as primary characters and do not require a thumb key for entry. Furthermore, the most frequently used consonants, N, R, and T, are assigned as primary characters and also do not require a thumb key for entry.

The third variable in the assignment of keys in the single-hand keyboard is the lessening of the multiplicity of words forming a raw input character string. Consequently, the key arrangement seeks to minimize the number of multiple word choices that can be entered by using the primary characters only, thereby enhancing the effectiveness of the ambiguity resolution logic. Moreover, the remaining alphabetic characters are assigned by the order of their frequency of appearance in usual text.

C. Character Sets

Figure 4:
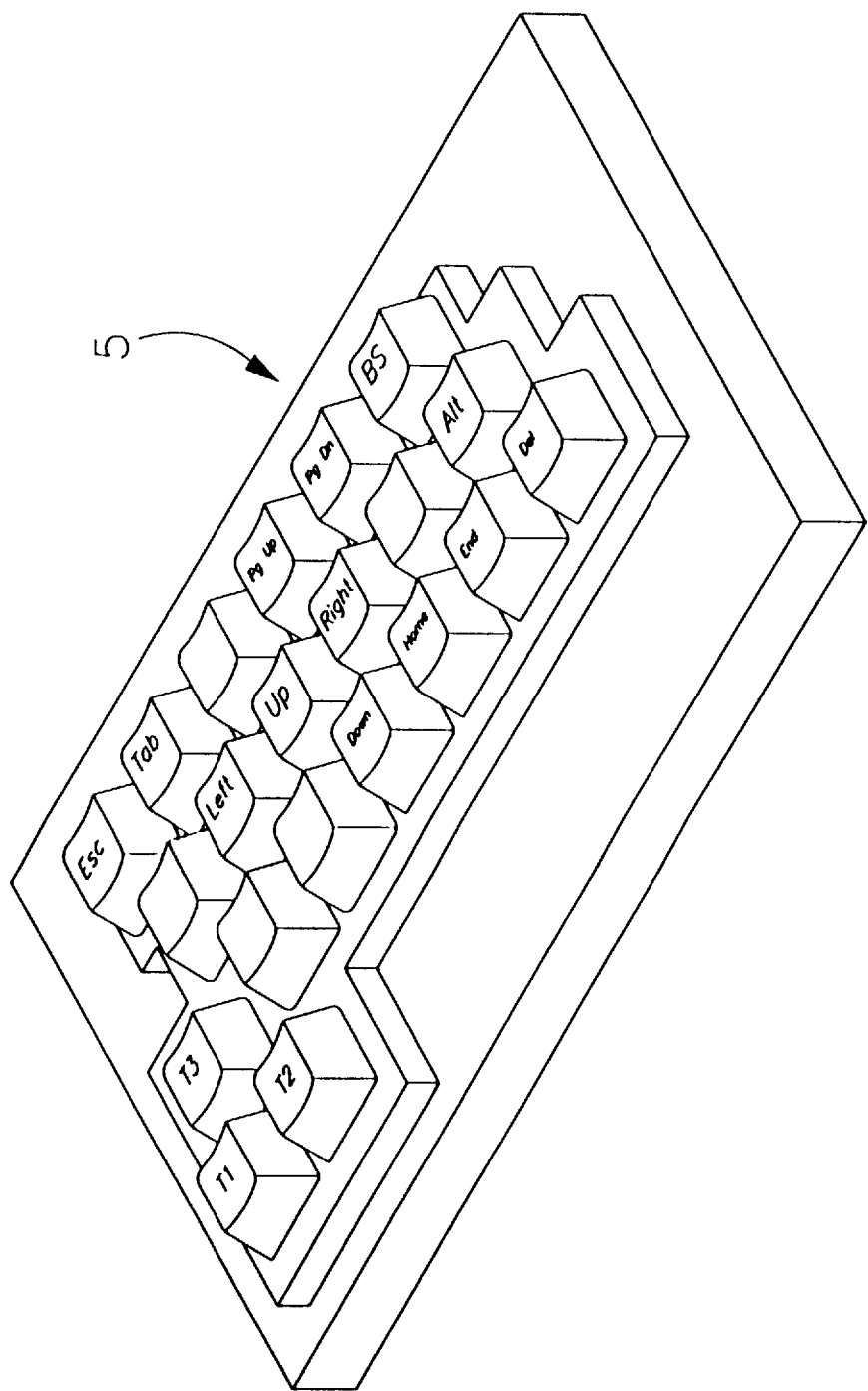
FIG. 4 is an isometric view of the keyboard of FIG. 2 showing the key layout for a control character set.

Referring to FIG. 4, the same set of finger keys are displayed in keyboard 5 as in FIG. 2, but some are labelled with their control functions for ease of understanding. The control keys are typically for cursor movement in a display and control functions, but other purposes would be readily apparent to one skilled in the art. A control character is entered by simultaneously entering the T1 thumb key and one of the control finger keys.

Figure 5:
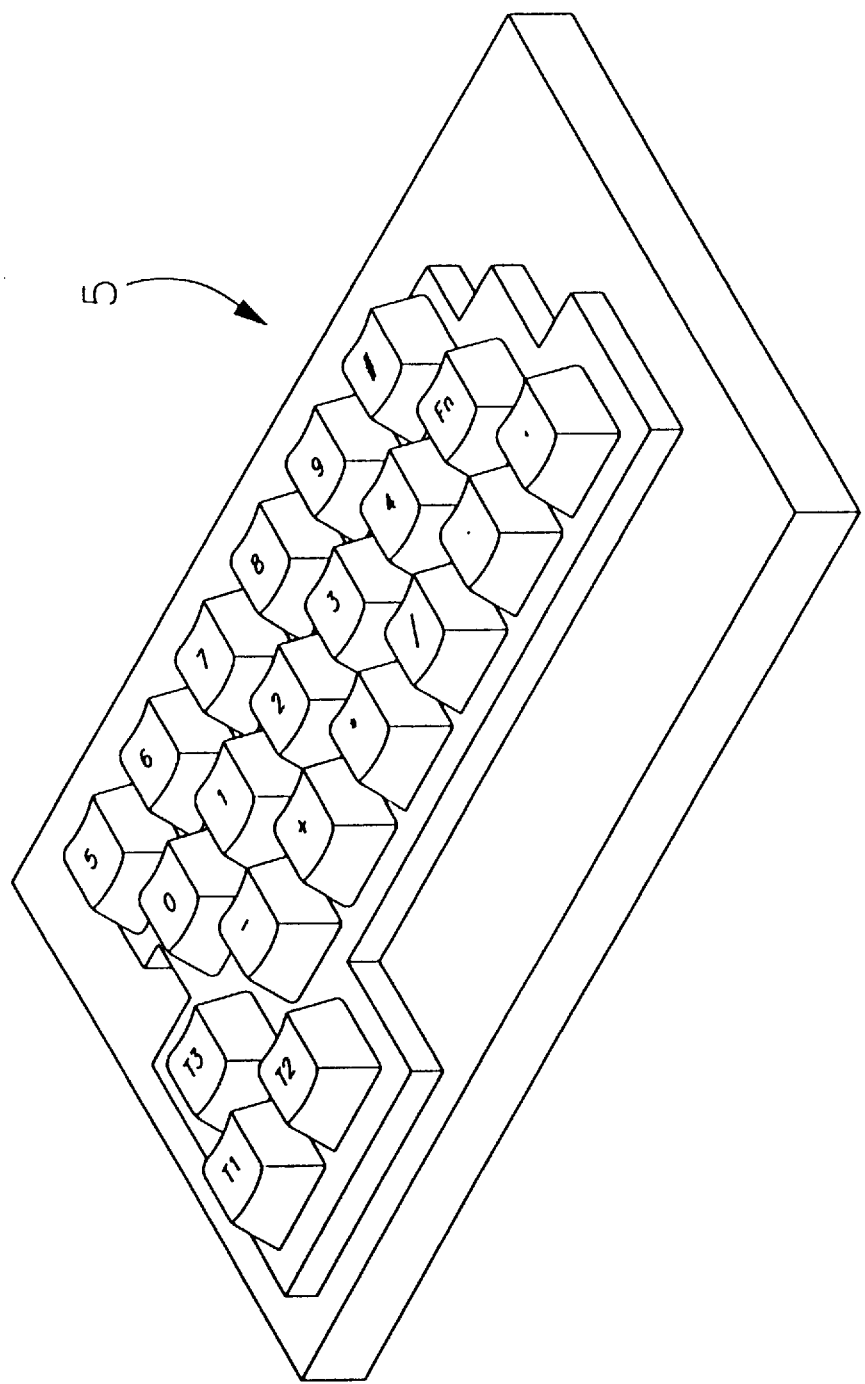
FIG. 5 is an isometric view of the keyboard of FIG. 2 showing the key layout for a numeric character set.

Referring to FIG. 5, the same set of finger keys are displayed in keyboard 5 as in FIG. 2, but each is labelled with a numeric character or mathematical operator function. These characters are used for entering numbers and mathematical operations wherein the functionality is provided through computer programs in a processor (such as microprocessor 285 of FIG. 26) that recognizes the significance of the respective numeric character or mathematical operator using methodologies known to one skilled in the art. A character from the numeric character set can be entered in two ways. The single-hand keyboard supports a numeric character entry mode. This mode is toggled by simultaneously entering the T2 thumb key and the Up-Ctrl/En-Num key. Once toggled, the keys labeled with numbers in FIG. 5 become number keys and a numeric character is entered by entering one of the numeric keys labeled. Second, a numeric character is also entered by simultaneously entering the T1 thumb key and a finger key with the desired number as shown in FIG. 5. This manner of entering a numeric character operates independently of the numeric character entry mode.

Figure 6:
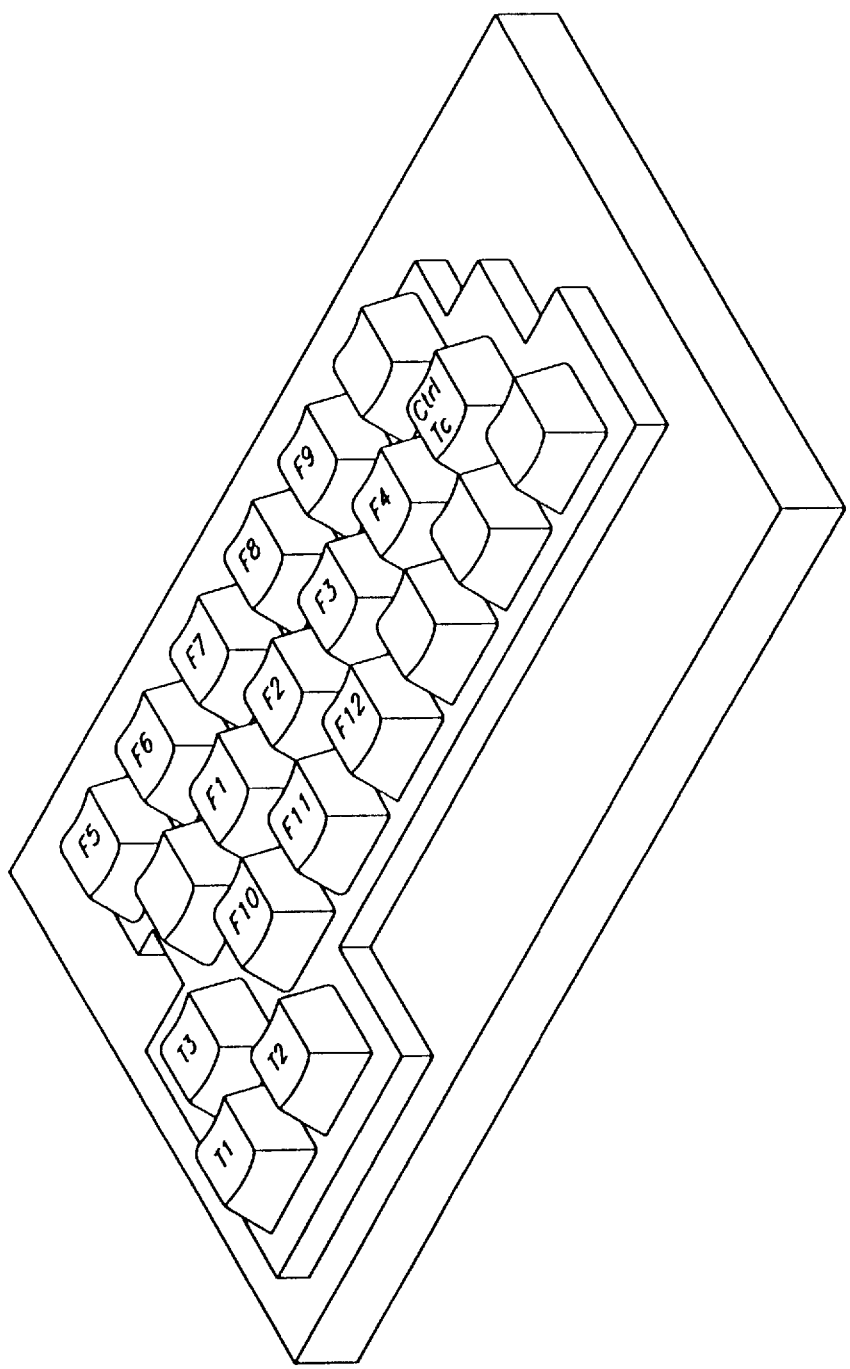
FIG. 6 is an isometric view of the keyboard of FIG. 2 showing the key layout for a function key character set.

Referring to FIG. 6, the same set of keys are displayed in keyboard 5 as in FIG. 2, but some are labelled F1 through F12 for their function key functions. Function keys can be assigned by, a user or programmer for various purposes as typically done with normal keyboards by changing the computer program function assigned to the keys. A function key from this set can be entered by simultaneously entering the T3 thumb key and the Tc/Ctrl key, followed by one of the function keys F1–F12.

Figure 7:
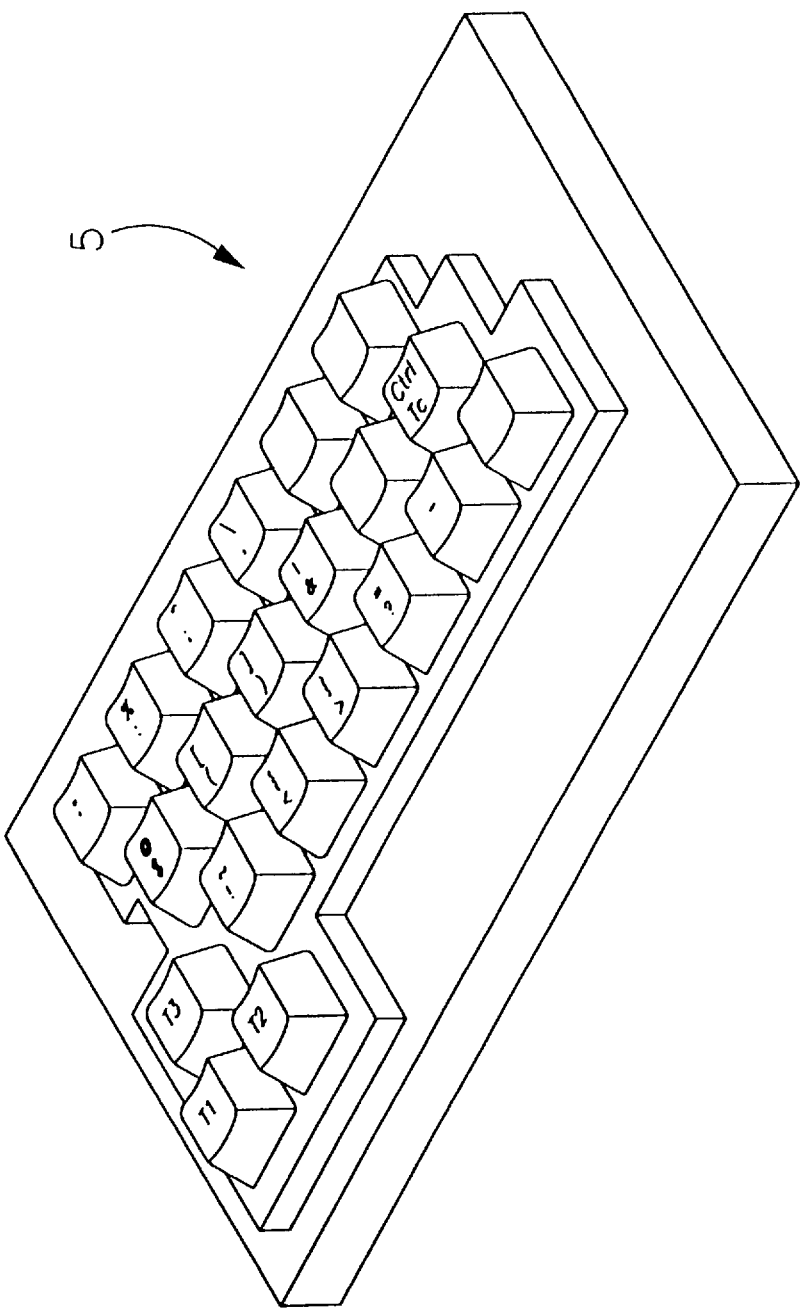
FIG. 7 is an isometric view of the keyboard of FIG. 2 showing the key layout for a terminal character set.

Referring to FIG. 7, the same set of keys are displayed as Keyboard 5 as in FIG. 2, but some are labelled with the symbols ' " : % ; ^ , \ $ @ ( [ ) ] & 1 ! ~ < { > } ? = – for purposes of this application with their terminal character functions. The set of terminal characters consists of punctuation marks and each terminal character is entered by entering the Tc/Ctrl key, followed by the corresponding key.

II. Ambiguity Resolution Logic

The keys of the keyboard are preferably labelled, as in FIGS. 2 and 3. The ambiguity resolution logic allows the user to select the desired character assigned to a multicharacter key using the T2 thumb key as described above. Alternatively, the ambiguity resolution logic can be used to select and display a sequence of characters that make up an actual word after the sequence of character keys bearing the desired characters are entered. In the latter case, if the desired sequence of characters or word is not generated and displayed to the user, the user can select one or more alternate character sequences or words by entering the Ar key until the desired sequence of characters or word is generated. Each time the Ar key is entered, another sequence of characters or word is selected and displayed using the characters assigned the keys that were previously entered.

To explain further, the character to be used caused by the assignment of multiple alphabetic characters to one key is an "ambiguity." The underlying premise is straightforward: by allowing a user to enter a character string without having to simultaneously enter a thumb key to select the alternate alphabetic character that is assigned to that multicharacter key, the user can maintain a faster and more efficient typing pace than if otherwise interrupted by the inconvenience of entering a thumb key. Ambiguity resolution logic enables a user to enter a sequence of keys and hence generate a sequence of characters for viewing on a display and to thereby defer resolving the character ambiguities inherent therein by virtue of exclusive use of primary character keys.

By way of example, assume that the user decides to input the word "this." Referring to FIG. 2, the user enters the word by striking the keys with the characters "T-H-I-S". Direct selection of the characters H and S require the T2 thumb key to be entered simultaneously with the I/H and O/S keys. Conversely, the user can strike the keys with the characters T-H-I-S, also T-I-I-O, which will cause the characters "tiio" to be generated in digital form and then displayed. Entry of the Ar key triggers the ambiguity resolution logic, which causes display of the word "this." The ambiguity resolution logic ascertains that the user really meant to enter a word with its second character being h and its fourth character being s instead of the characters i and o, as was actually registered by the keyboard. Thus, the user saves effort by avoiding having to enter the T2 thumb key twice for this sequence of character keys. This operation will now be discussed in more detail.

A. Basic Ambiguity Resolution Logic

Character string ambiguities are resolved on demand. To invoke the ambiguity resolution after a string of keys have been entered, such as for a complete word, the user depresses the Ar key. Entry of the Ar key causes the ambiguity resolution logic to present to the user a sequence of characters or a word from a list of word choices corresponding to the possible spellings of words enterable by the user based on the multicharacter keys entered. If the new sequence of characters or word is not the desired one the Ar key can be entered time after time until the desired sequence of characters or word is generated and displayed.

Figure 8:
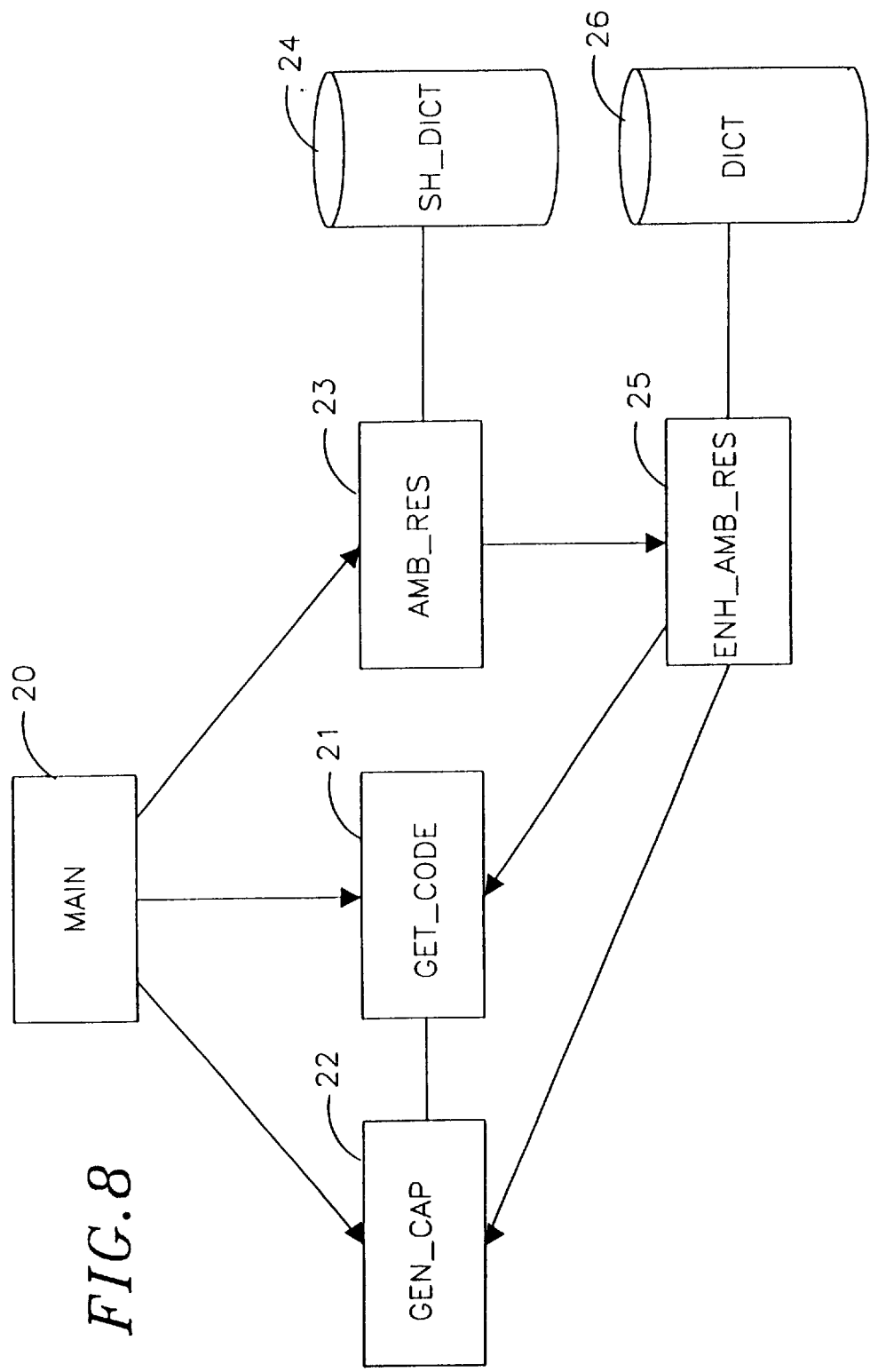
FIG. 8 is a block diagram of a computer program forming ambiguity resolution logic for use in a programmed computer in the keyboards of FIGS. 1 and 2 or the system of FIG. 26.

Referring to FIG. 8, an overall block diagram of the computer program or ambiguity resolution logic that is to be run on the computer system of FIG. 26 is illustrated. The system is implemented on a microprocessor system with memory and comprises five functional modules and two data dictionaries. The point of entry is the MAIN routine 20, which calls the GET_CODE routine 21, the GEN_CAP routine 22, and the AMB_RES routine 23. In turn, the AMB_RES routine 23 accesses the SH_DICT dictionary 24 and calls the ENH_AMB_RES routine 25.

The second stage of ambiguity resolution logic is embodied in the ENH_AMB_RES routine 25. Like the AMB_RES routine 23, the ENH_AMB_RES routine 25 accesses the dictionary, the DICT dictionary 26. The ENH_AMB_RES routine 25 also calls the GET_CODE routine 21 and the GEN_CAP routine 22. The GEN_CAP routine 22 also calls the GET_CODE routine 21. The precise functionality of the foregoing routines will now be described in more detail.

Figure 9:
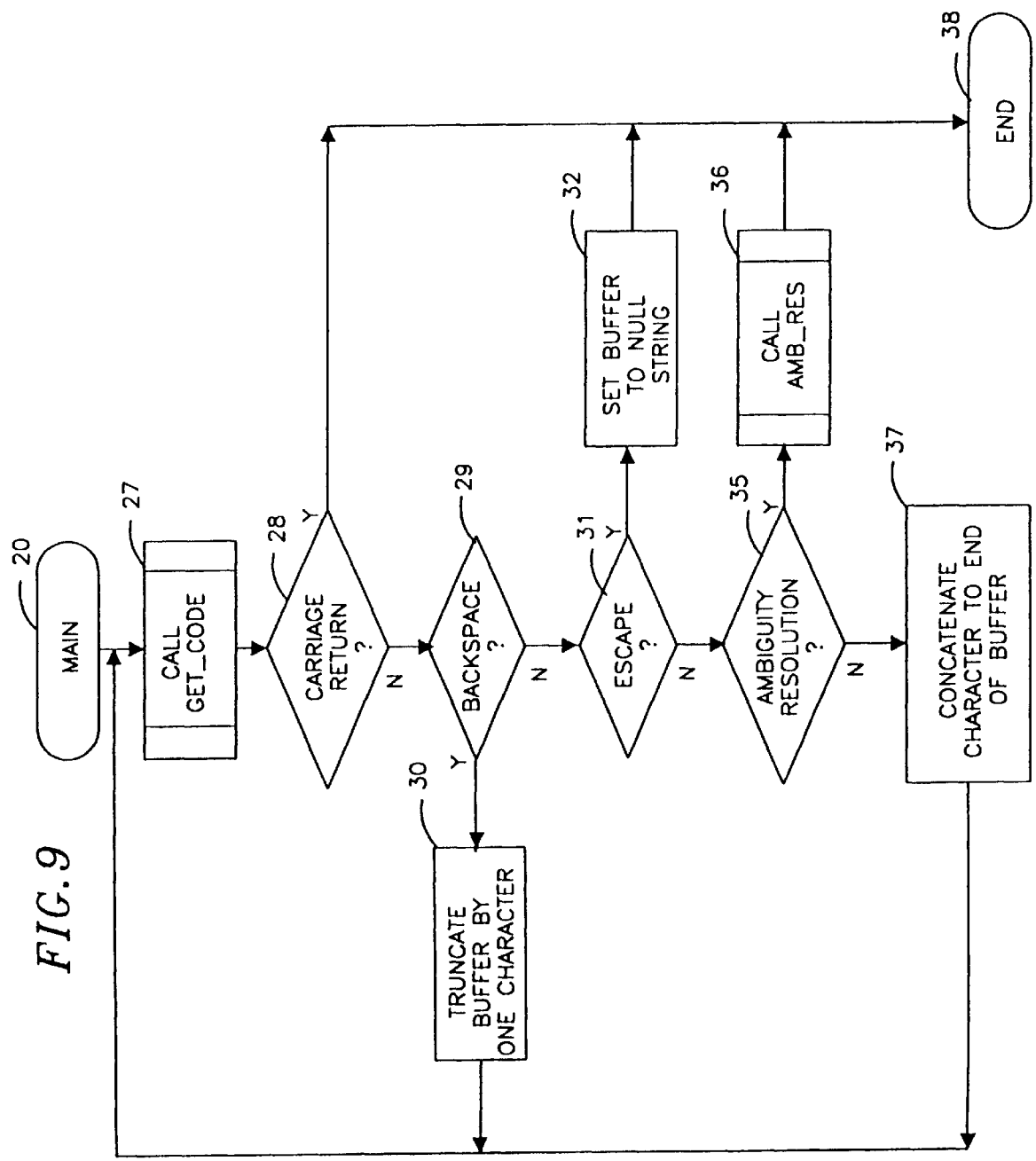
FIG. 9 is a flow diagram of the MAIN routine of FIG. 8.

Referring to FIG. 9, a flow diagram for the MAIN routine 20 is illustrated. The purpose of the MAIN routine 20 is to return a single input word entered by the user. The routine accepts one input keycode at a time by iteratively calling the GET_CODE routine 21 (block 27). A keycode is a numeric value that uniquely identifies a character for entry of the key that was inputted via the keyboard. Keycodes are required because multiple characters are represented on each key. The ASCII character set comprises a commonly known set of keycodes.

After accepting an input keycode, the MAIN routine 20 parses that keycode to determine the appropriate action to take (blocks 28–35). The routine maintains a buffer (see FIG. 26) in which it assimilates the set of input keycodes received from the GET_CODE routine 21. If the input keycode is a carriage return (block 28), the routine is exited (block 38). If the input keycode is a backspace (block 29), the buffer of input keycodes is truncated by one keycode which effectively "erases" the last character typed (block 30). The MAIN routine 20 will then accept a new keycode and begin the parsing process anew. If the input keycode is an escape (block 31), the buffer of input keycodes is set to an empty, or null, string (block 32) and the MAIN routine 20 is exited (block 38). If the input keycode is an ambiguity resolution character (block 35), that is, the Ar key was entered, the AMB_RES routine 23 is called (block 36) and the MAIN routine 20 is exited (block 38). Finally, if the input keycode is neither a carriage return, backspace, escape, or ambiguity resolution character, the buffer of input keycode is concatenated with the input keycode (block 37), the MAIN routine 20 accepts the next input keycode, and the parsing process begins anew.

Figure 10:
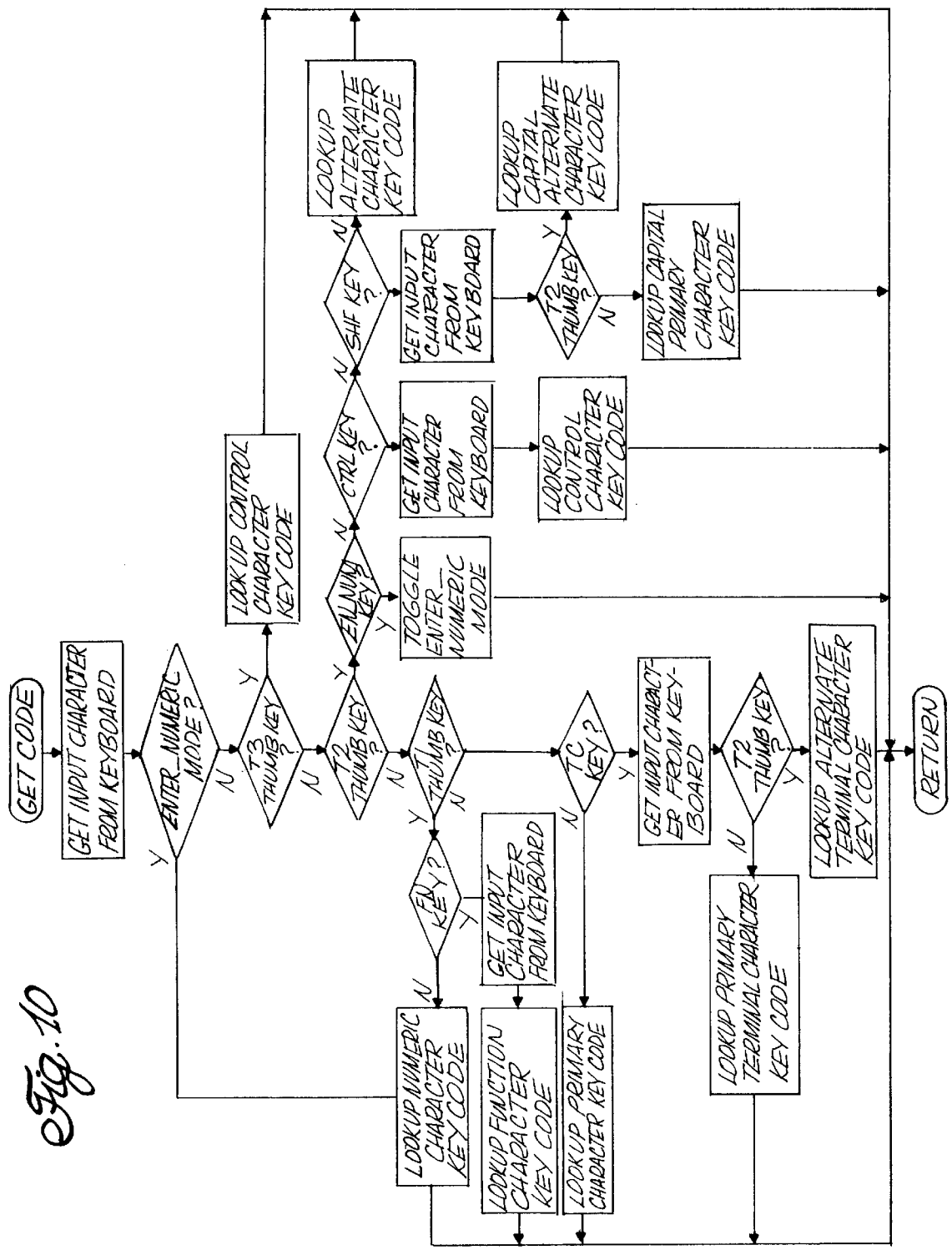
FIG. 10 is a flow diagram of the GET_CODE routine of FIG. 8.

Referring to FIG. 10, a flow diagram for the GET_CODE routine 21 called at block 27 of the MAIN routine 20 is illustrated. The primary purpose of the GET_CODE routine 21 is to accept one or more raw input characters from the keyboard and to return to the calling routine a single keycode corresponding to a single character from one of the five character sets supported by the single-hand keyboard (alphabetic, control, numeric, function key, and terminal character sets).

The GET_CODE routine 21 begins by accepting a raw input character selected by a keystroke on the keyboard (block 40). The MAIN routine 20 maintains an internal indication of whether the keyboard is currently in a numeric character entry mode. This internal indication (not shown) is checked by the GET_CODE routine 21 (block 41) and if the indication is presently set, the routine uses the value of the input character to look up the numeric character keycode (block 42) from an internal table (not shown) and returns that keycode to the calling routine MAIN (block 67). If the internal indication is not set, the GET_CODE routine 21 parses the raw input character to determine whether one of the thumb keys have been entered (blocks 43, 45, 57).

If the input character is a T3 thumb key (block 43), the routine looks up the keycode from an internal table (not shown) for the control character corresponding to the appropriate finger key (block 44) and returns that keycode to the calling routine (block 67).

If the input character is a T2 thumb key (block 45), the routine first checks if the Up-Ctrl/En-Num key was also entered (block 46). If so, the routine toggles a numeric character entry mode indicator (not shown) (block 47) and returns to the calling routine (block 67). If the Tc/Ctrl key was also entered (block 48), the routine accepts another input character from the keyboard (block 49) and looks up the keycode from an internal table (not shown) for the control character corresponding to the appropriate finger key (block 50). The routine returns that keycode to the calling routine (block 67). If the Sp (Shf) key was also entered (block 51), the routine accepts another raw input character from the keyboard (block 52). The GET_CODE routine 21 then determines whether the T2 thumb key was entered a second time (block 53), and if so, looks up the keycode for the capitalized alternative character corresponding to the appropriate finger key (block 54). Otherwise, if the T2 thumb key was not entered a second time, the routine looks up the character keycode for the capitalized primary character corresponding to the appropriate finger key (block 55). In either case, the GET_CODE routine 21 returns the keycode to the calling routine (block 67).

If the original raw input character was a T2 thumb key and the Up-Ctrl/En-Num, Tc/Ctrl, or Sp/Shf keys were not entered, the GET_CODE routine 21 looks up the keycode from an internal table (not shown) for the alternate character corresponding to the appropriate finger key (block 56) and the routine returns .that keycode to the calling program (block 67).

If the raw input character is a T1 thumb key (block 57), the GET_CODE routine 21 ascertains whether the Tc/FN key was also entered (block 58). If so, the routine gets another raw input character from the keyboard (block 59) and looks up the keycode from an internal table (not shown) for the function key character corresponding to the appropriate finger key (block 60). Otherwise, the routine looks up the keycode from an internal table (not shown) for the numeric character corresponding to the appropriate finger key (block 42). In either case, the routine returns the keycode to the calling routine (block 67).

If the T1, T2, or T3 thumb keys were not entered, the GET_CODE routine 21 checks if the raw input character is the Tc key (block 61). If it is not, a primary character was entered and the routine looks up the keycode from an internal table (not shown) for the primary character corresponding to the appropriate finger key (block 62). Otherwise, the routine gets another raw input character from the keyboard (block 63) and determines whether the T2 thumb key was entered a second time (block 64). If so, the routine looks up the keycode from an internal table (not shown) for the alternate terminal character corresponding to the appropriate finger key (block 65). Otherwise, the routine looks up the keycode from an internal table (not shown) for the primary character corresponding to the appropriate finger key (block 66). The routine returns the keycode to the calling routine (block 67).

Figure 11:
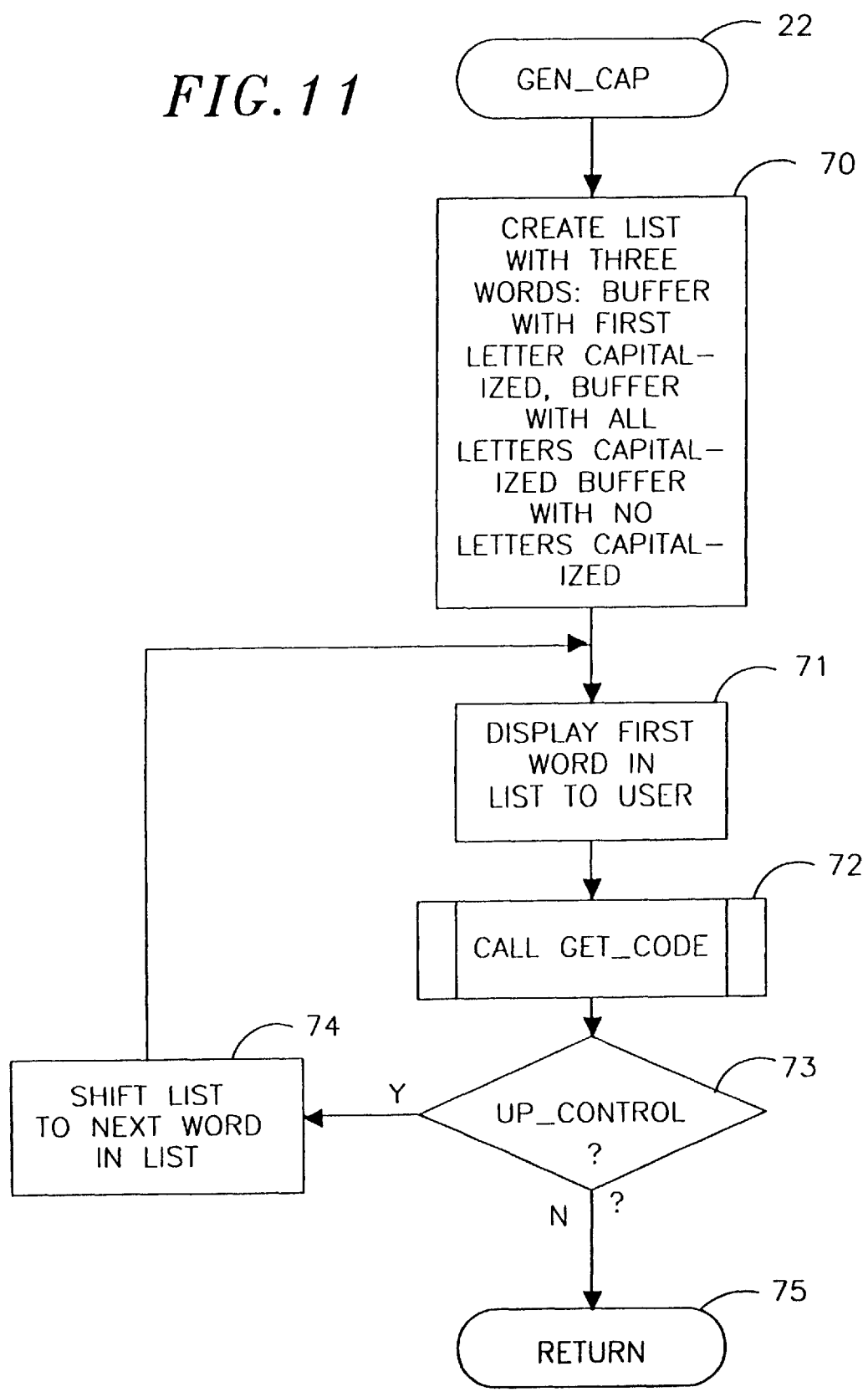
FIG. 11 is a flow diagram of the GEN_CAP routine of FIG. 8.

Referring to FIG. 11, the GEN_CAP routine 22 is illustrated. The purpose of this routine is to generate a three word list of variations on the capitalization of the input word, prompt the user to select one of these words, and return that word to the calling routine.

The GEN_CAP routine 22 begins by generating three variations of the input word stored in the buffer: first character capitalized, all characters capitalized, and no characters capitalized (block 70). The routine then displays the first word in this list to the user (block 71) and calls the GET_CODE routine 21 to obtain the next keycode (block 72). If the input keycode is an Up-Ctrl key (block 73), the routine shifts the order of the list with the next word in the list at the beginning of the list (block 74). The routine again displays and prompts the user. Otherwise, the routine returns the selected word to the calling program (block 75).

For example, assume that a user enters an input character string comprising the characters "cat." The GEN_CAP routine 22 generates the three word list comprising "Cat, CAT, cat" (block 70). The routine displays the first word, "Cat", to the user (block 71) and gets the next input keycode (block 72). Assume that the user enters the Up-Ctrl key (block 73). The first word in the list becomes "CAT" (block 74) and this word is displayed to the user (block 71). The GEN_CAP routine 22 gets the next input keycode (block 72) and, assuming that it is not an Up-Ctrl key (block 73), the character string "CAT" is returned to the calling routine (block 75).

Figure 12:
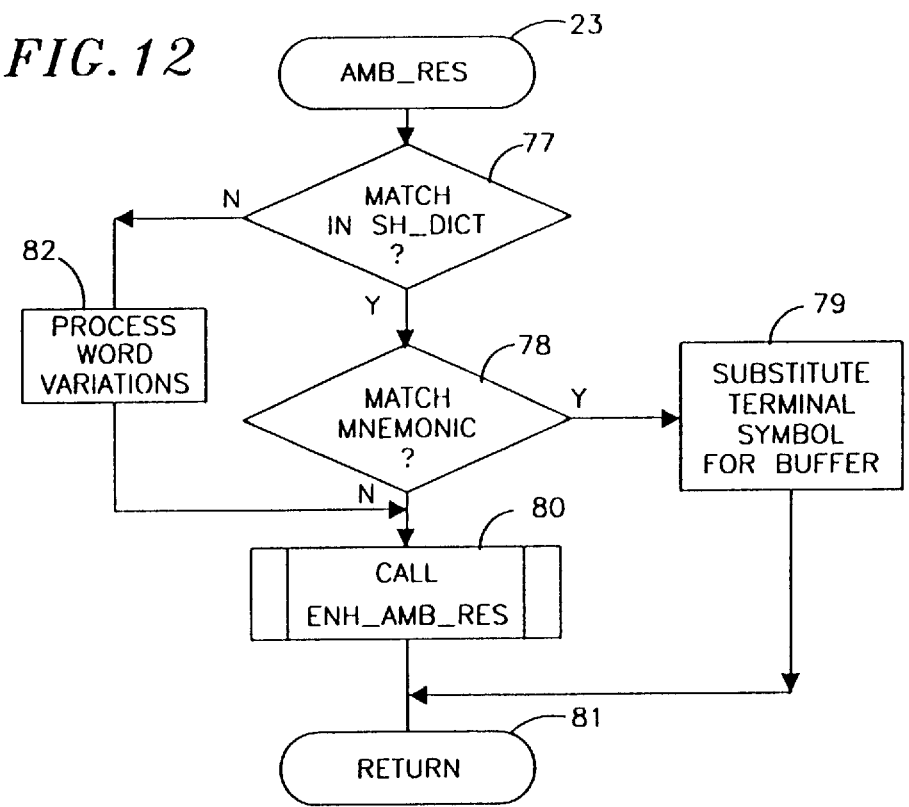
FIG. 12 is a flow diagram of the AMB_RES routine of FIG. 8.

Referring to FIG. 12, a flow diagram for the AMB_RES routine 23 is illustrated. The AMB_RES routine 23 comprises the first level of ambiguity resolution logic. It seeks to find an exact and literal match between the raw input string and its table of word pairings. The purpose of this routine is to find either an exact match for the input character string in the SH_DICT dictionary or to substitute a terminal character symbol for that string.

The routine begins by searching for an exact match between the character input string stored in the buffer against the set of entries stored in the SH_DICT dictionary (block 77). The SH_DICT dictionary comprises a set of word pairings. The structure and process for creating the SH_DICT dictionary is described below.

If an exact match between the input string and an index word in the SH_DICT dictionary is found (block 77), the routine checks if the input string matches a terminal character mnemonic corresponding to a frequently-used terminal character (block 78).

In the preferred embodiment, special consideration is given to selected punctuation marks that are frequently used in ordinary text. These terminal symbols include the period, comma, colon, semicolon, question mark, exclamation mark, backspace, and carriage return. As set forth above, these punctuation symbols are enterable through the usual method for entering a character from the terminal character set. Remember that a terminal character can be entered by first entering the Tc key, followed by a terminal character finger key corresponding to the appropriate terminal character (see FIG. 7).

The usual method of entering terminal characters, especially those that are frequently used, causes an interruption in the natural flow of typing on the single-hand keyboard. This is primarily because the little finger is required to move away from its home row position thereby throwing off the timing of the user. Consequently, in the preferred embodiment, a scheme is provided whereby selected frequently-used terminal characters can be entered by using a mnemonic key sequence, followed by the Ar key. The set of mnemonics is set forth in Table 2.

TABLE 2

| TERMINAL CHARACTER | INPUT CHARACTERS | MNEMONIC |
|---|---|---|
| . (period) | NE | PE |
| , (comma) | RO | CO |
| : (colon) | ROL | COL |
| ; (semicolon) | OE | SE |
| ? (question mark) | BD | QU |
| ! (exclamation) | FE | XE |
| ← (backspace) | EA | n/a |
| ↵ (carriage return) | EE | n/a |

Referring to Table 2, three columns are shown. The first column lists the frequently-used terminal characters. The second column lists the primary input characters required to enter the mnemonic key sequence for the desired frequently-used symbol. The third column lists the mnemonic, where applicable, for the terminal symbol. The difference between the second and third columns is that the mnemonic column substitutes the appropriate alternate characters such that the mnemonic can serve as a memory device. For instance, "QU" is easier to remember than "BD".

An example illustrates this feature. Assume that a user wants to type a question mark using the mnemonic scheme. The user would type in "BD" (primary characters) followed by the Ar key. The AMB_RES routine 23 matches the input primary characters "BD" to a known mnemonic (block 78) and substitutes for the characters "BD" that are stored in the buffer the question mark "?" (block 79). Note that the Ar key serves the special function of triggering the ambiguity resolution logic and causes it to substitute the desired terminal character for the two or three input characters comprising the mnemonic therein entered by the user.

Figure 27A:
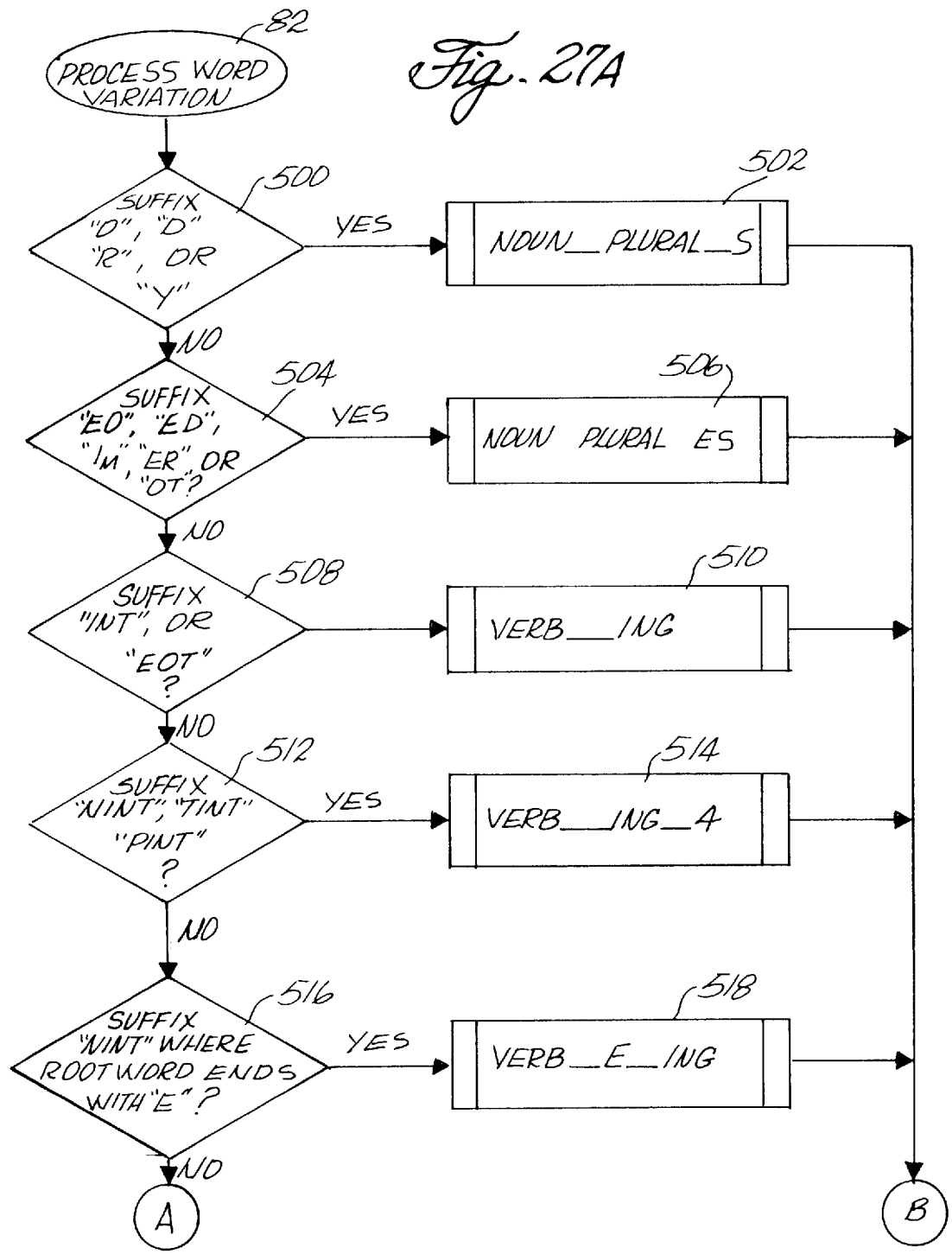
FIGS. 27A–27B depict flow diagrams of the PROCESS WORD VARIATION routine of table 3 and in microfiche 1, frame 25.
Figure 27B:
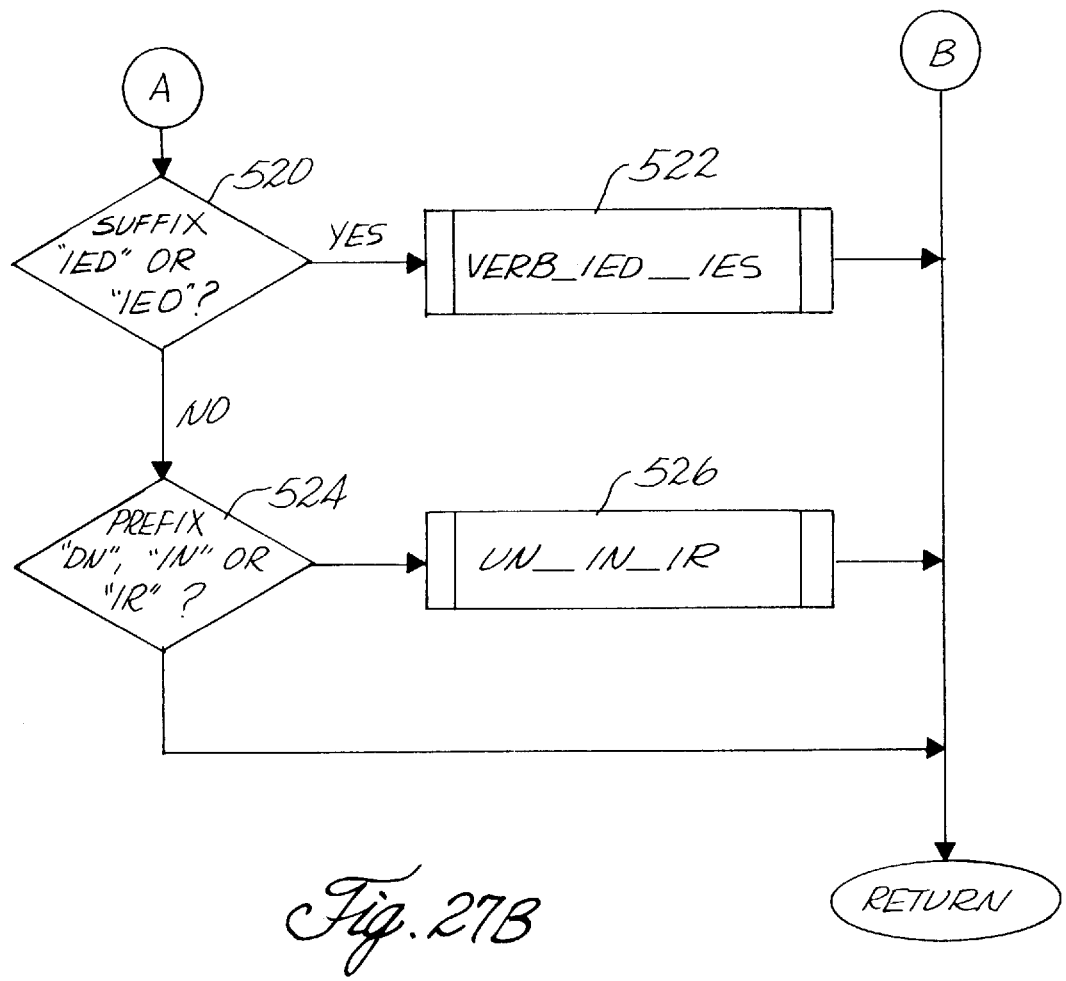

If the input character string does not match a known mnemonic, the AMB_RES routine 23 calls the ENH_AMB_RES routine 25 and enters the second stage of ambiguity resolution logic (block 80). If the input character string does not match an entry in the SH_DICT dictionary, the AMB_RES routine 23 tries to apply word variation rules (block 82). It checks whether a possible stem of the word (root word) matches a word in the SH_DICT dictionary. This is for applying word prefix and suffix rules. A program listing in the Prolog programming language for the PROCESS WORD VARIATION and NOUN_PLURAL_S routines is provided in Table 3 and in the microfiche appendix at microfiche 1, frame 25. The following is a description of FIGS. 27A–27B, which depict a flow diagram of the PROCESS WORD VARIATION 82 and NOUN_PLURAL_S routines of table 3. The routine checks for any suffixes or prefixes, or misspellings of prefixes and suffixes caused by use of primary characters. The routine accomplishes this by comparing subsequences of a sequence of entered characters with sets of characters from tables. In particular, the routine first checks in decision diamond 500 for a suffix that ends in the character "o" (the primary letter for "s"), "d," "r," or "y." If such suffix is present, a NOUN_PLURAL_S 502 routine is invoked.

If the suffix is neither "o," "d," "r," or "y," the routine checks in decision diamond 504 for suffixes with the letters "eo" (primary letters for "es"), "ed," "lm" (primary letters for "ly"), "er" , and "ot" (primary letters for "st"). If such letters are present, a NOUN_PLURAL_ES 506 routine is invoked. This routine, like the NOUN_PLURAL_S 502 routine, corrects the spelling of the root word and concatenates a correct spelling of the suffix to return a corrected spelling of the original input word.

The PROCESS WORD VARIATION 82 routine also checks for other suffixes, namely for primary letters representing the suffixes "ing" and "est" (decision diamond 508); "ping", "ting", and "ging" (decision diamond 512); "ing" where the root word ends in the letter "e" (decision diamond 516); and "ied" and "ieo" (decision diamond 520). The occurrence of such primary letters cause the routines in blocks 510, 514, 518, and 522 to be invoked. These routines perform functions equivalent to the functions performed by the NOUN_PLURAL_S 502 routine.

The PROCESS WORD VARIATION 82 routine further checks for primary letters representing the prefixes "un," "in," and "ir," in decision diamond 524. If these prefixes are present, a UN_IN_IR 526 routine is invoked to drop the prefix and correct the root word. The corrected root word is then concatenated with the corrected prefix and returned.

Figure 28:
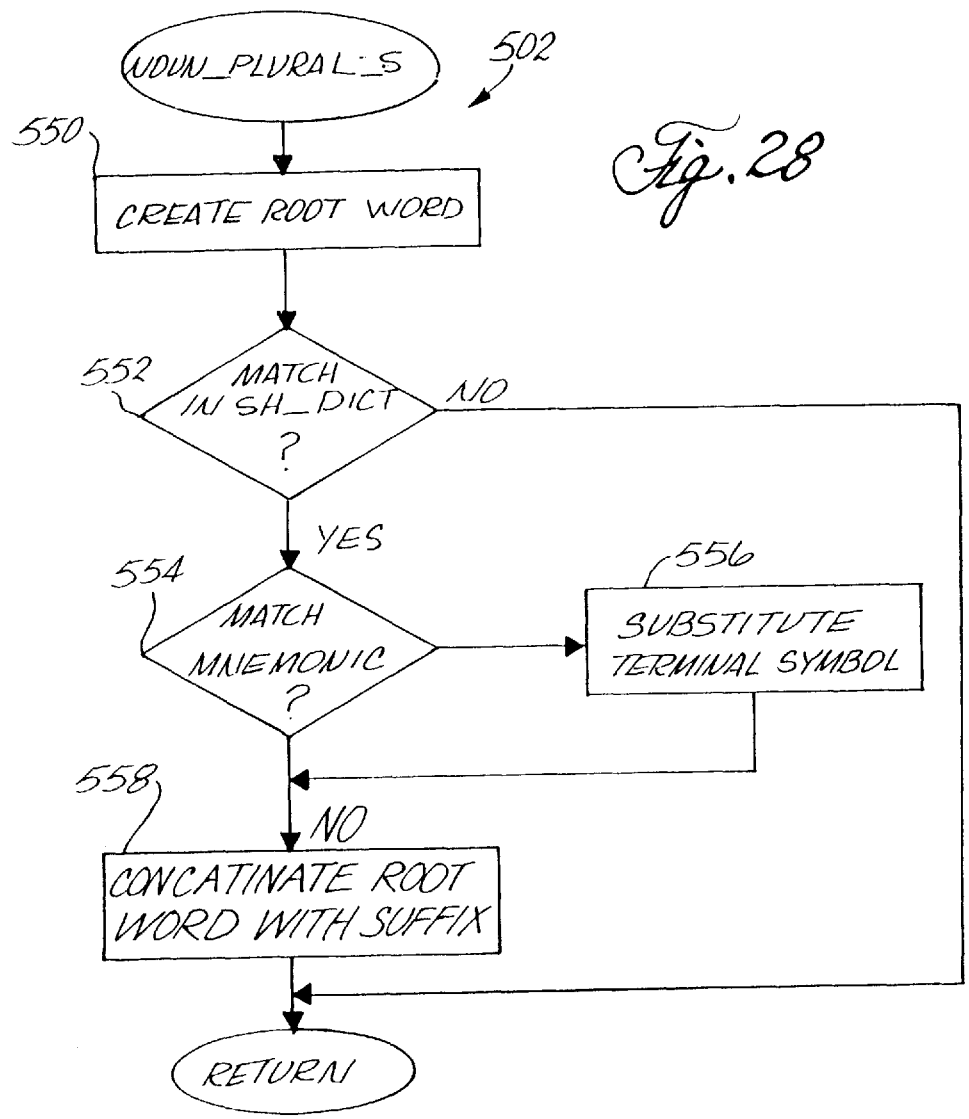
FIG. 28 depicts a flow diagram of the NOUN_PLURAL_S routine of table 3 and in microfiche 1, frames 25–26.

FIG. 28 is a flow diagram of the NOUN_PLURAL_S 502 routine. A sample program listing for the NON_PLURAL_S routine is provided in Table 3 and in the microfiche appendix at microfiche 1, frames 25–26. This routine first creates a root word 550 from the original input word by dropping the last character of the input word. A check is then made in decision diamond 552 as to whether or not the root word matches a word in the SH_DICT dictionary 552. If the ambiguity was caused due to the root word being entered by using only primary characters, the correct spelling of the root word is returned. If the ambiguity was caused due to the usage of a terminal character mnemonic, this mnemonic is returned to be handled by block 554. In block 554, if the returned word from decision diamond 552 is a mnemonic, the mnemonic is replaced by the corresponding terminal symbol 556 and returned. Finally, in block 558, the corrected root word is concatenated with a corrected suffix, if such correction is necessary, and the corrected form of the original word is then returned in block 560.

The following example illustrates the NOUN_PLURAL_S 502 routine. Assume that a user, desiring to type the word "HATS," uses only the primary keys and types the sequence of characters "IATO." The PROCESS WORD VARIATION 82 routine determines in decision diamond 500 that the last character of the input sequence of characters is "o" and invokes the NOUN_PLURAL_S 502 routine. This routine first checks a root sequence of character by deleting the last character from the sequence of characters. The routine then checks the root word "IAT" in the SH_DICT dictionary. Since "IAT" matches the word "HAT," the corrected word "HAT" is returned. Furthermore, because the correct spelling for "O" is "S," the corrected suffix is attached to the corrected root word to return the word "HATS."

TABLE 3

```
word_input_sh( W, X_out, Ter ) :-
        string_length( W, L ) ,
        [! case([ sh_dict( W, X ) -> u_dict( X , X_out )
,
        noun_plural_s( W , L , X_out) -> true ,
                noun_plural_es( W , L , X_out) -> true
,
        verb_ing( W, L, X_out )          -> true ,
        verb_e_ing( W, L, X_out )        -> true ,
                verb_ing_4( W, L, X_out )    -> true
,
                verb_ied_ies( W, L, X_out )   -> true
,
        un_in_ir(  W, L, X_out )  -> true ,
                true -> X out = W
```

TABLE 3-continued

```
        ])
        !].
%%% noun_plural
noun_plural_s( W , L , X_out ) :- %%% s and verb (e)d
        L > 2,
        L01 is L − 1 ,
        substring( W, L01, 1 , W01 ) , %%% converted from s,
d, y
        W01 = $o$ ; W−1 = $d$ ; W01 = $r$ ; W01 = $y$ ) ,
        substring( W, 0, L01 , W02 ) ,
        sh_dict( W02 , Y ) ,
        u_dict( Y , Out ) ,
   string_length( Out, Len ) ,
        Len01 is Len − 1 ,
        substring( Out, Len01, 1, Last_char ) ,
        case([ W01 = $o$           ->concat( [ Out, $s$ ]
, X_out ) ,
          ( W01 = $d$ ,
            Last_char = $e$ )    -> concat( [ Out, $d$ ]
, X_out ) ,
          ( W01 = $r$ ,
            Last_char = $e$ )    -> concat( [ Out, $r$ ]
, X_out ) ,
          W01 = $y$              -> concat( [ Out, $y$ ]
, X_out ) ,
          true       -> fail
        ]) .
```

Regardless of the result from the ENH_AMB_RES routine 25, the AMB_RES routine 23 returns to the calling routine (block 81).

B. Enhanced Ambiguity Resolution Logic In its basic form, the ambiguity resolution logic resolves literal character string ambiguities. However, in the preferred embodiment, an additional level of ambiguity resolution logic is provided to enhance the basic functionality of the underlying system.

Figure 13:
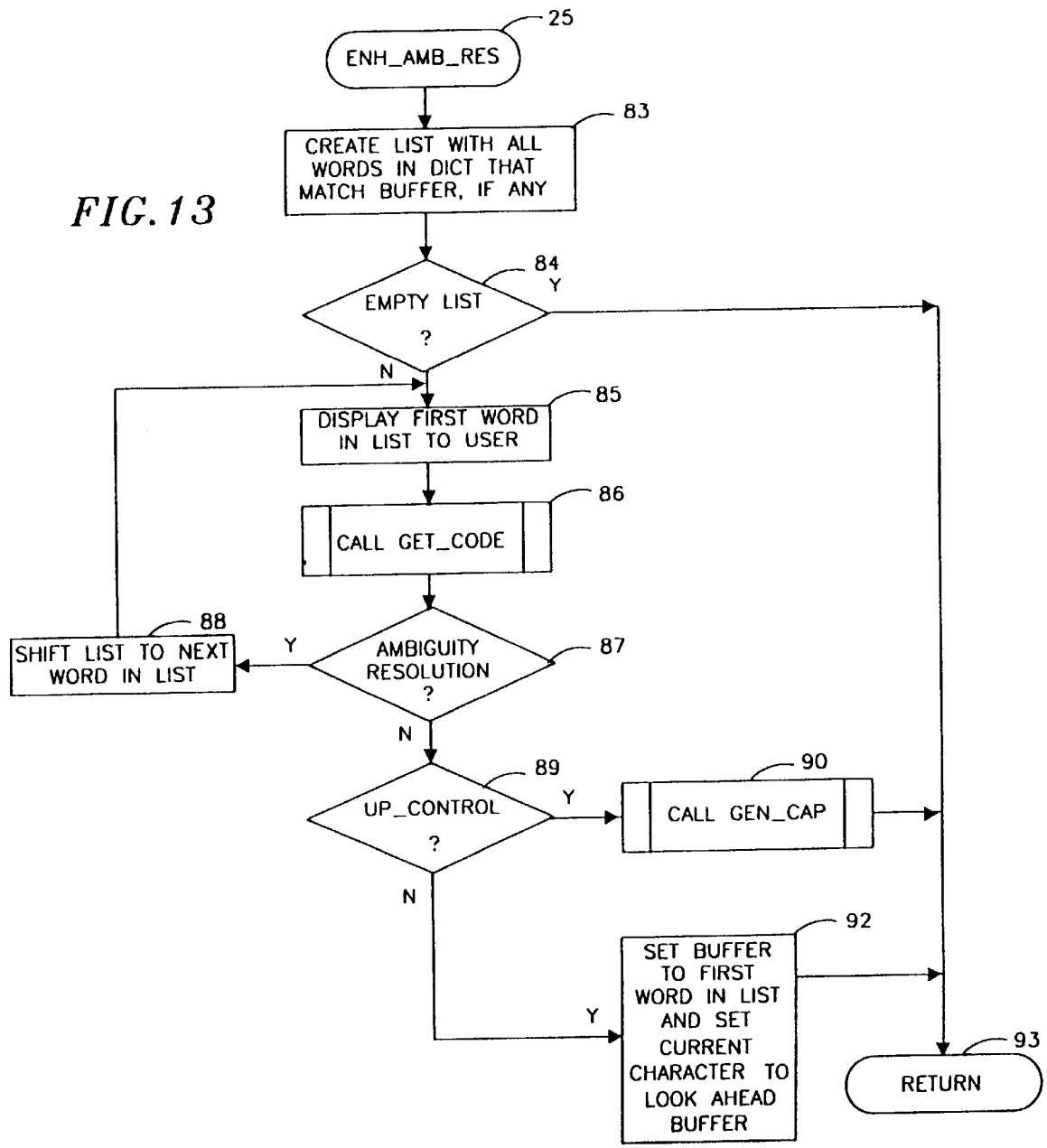
FIG. 13 is a flow diagram of the ENH_AMB_RES routine of FIG. 8.

Referring to FIG. 13, the ENH_AMB_RES routine 25 is illustrated. This routine is the entry point from the first stage to the second stage and serves a three-fold purpose. First, it prompts the user with more word choices comprising the collection of words which have an identical index word. The collection is created in a dictionary generation process and is stored in the DICT dictionary.

Second, the routine presents to the user the various forms of verb tenses corresponding to the input word. For example, assume that the user has entered the primary characters "IO." The AMB_RES routine 23 resolves the character string ambiguity and prompts the user with the word "IS." The ENH_AMB_RES routine 25 displays the list "is, was, will be, has been, had been."

Third, the routine incorporates the ability to execute macros that are triggered by the input character string. For instance, the word "I" can be set up to fill in the name of the user, such as "Masakatsu Sugimoto" or to execute a function to display the time of day or set a stopwatch timer.

The ENH_AMB_RES routine 25 begins by creating a list of all words, if any, in the DICT dictionary that match the input string contained in the buffer (block 83). The structure and process for creating the DICT dictionary is described below. If no match is found and the list is an empty list (block 84), the routinemerely returns to the calling routine (block 93). Otherwise, as with the AMB_RES routine 23, the ENH_AMB_RES routine 25 displays the first word in the list to the user (block 85) and calls the GET_CODE routine 21 to obtain the next keycode (block 86). If the keycode matches the Ar key (block 87), the routine shifts the order of the list with the next word in the list at the beginning of the list (block 88). Otherwise, the routine determines if the input keycode is an Up-Ctrl key (block 89). If so, the GEN_CAP routine 22 is called (block 90) and the result is returned to the calling routine (block 93). If the input keycode is neither an Ar key nor an Up-Ctrl key, the first word in the list is accepted (block 92), the current character is placed in a lookahead buffer for further usage and returned to the calling routine (block 93).

Note that the ENH_AMB_RES routine 25 introduces the most flexibility in terms of enhancing the functionality of the basic ambiguity resolution logic. The set of "words" in the DICT dictionary is of a general format. The first word is an index word. The second entry in the DICT dictionary can be any word, any list of words or a function value and it will be readily apparent to one skilled in the art that the level of functionality can be readily expanded upon. The set of enhanced features presented herein (tenses and macros) is merely illustrative and not meant to be an exclusive nor exhaustive list of enhancements to the basic ambiguity resolution logic.

Source code listings of a preferred embodiment of the ambiguity resolution logic are included in a microfiche appendix. These program listings are written in Arity Prolog, a variant of the Prolog programming language. The definition of the Prolog programming language is detailed in W. F. Clocksin & C. S. Mellish, *Programming in Prolog*, (Cambridge 1984), herein incorporated by reference.

The programs of Appendix is preferably run as an IBM-compatible personal computer running the MS-DOS operating system 5.0 or higher. The Arity Prolog compiler and interpreter, Version 6.1, is loaded into the random access memory (RAM) of the personal computer. Preferably, the personal computer uses an Intel 80286-compatible microprocessor and is equipped with two megabytes or more of RAM.

C. Creation of Ambiguity Resolution Logic Dictionaries

The ambiguity resolution logic accesses a pair of data dictionaries, the DICT and SH_DICT dictionaries. The structure and process for creating these dictionaries is now described.

1. SH_DICT Dictionary

Referring to FIG. 14, the structure of the SH_DICT dictionary is illustrated. In the preferred embodiment, the dictionary comprises a set of word pairings organized into fourteen groups, one group for each character in the set of primary characters (A, B, D, E, F, I, J, K, L, M, N, O, R, and P). The ambiguity resolution logic takes advantage of the first character of the input word when looking for a match in the SH_DICT dictionary. To speed up the search process, the dictionary is structured so that the first character of each input word also identifies the appropriate word group from within the dictionary.

The grouping label 100 identifies each of the fourteen word groups. The grouping label 100 comprises the primary character concatenated to the string "_SH_DICT." For example, the grouping label 100 corresponding to the primary character A is "A_SH_DICT."

Each word pair comprising an entry in the SH_DICT dictionary comprises an index word 101 and a matched word 102. The index word 101 corresponds to a character string that can be directly entered using the single-hand keyboard and using only primary characters. Stated differently, every word in the set of all index words 101 comprises only primary characters.

The matched word 102 is a correctly spelled word that substitutes alternate characters for those primary characters appearing in the index word 101 that cause the index word 101 to be ambiguous. On the other hand, not every word entered using primary characters is ambiguous. Thus, some of the word pair entries in the SH_DICT dictionary may have identical entries for index word 101 and matched word 102. Moreover, there may be several word pair entries in the dictionary that use the same index word 101.

Referring to FIG. 14, a diagram depicting an excerpt of the word grouping for the primary character A in the SH_DICT dictionary is shown. An example of how the ambiguity. resolution logic operates is now discussed. Assume that the user enters the input character string "aorribe." The basic ambiguity resolution logic uses this character string as the index word 101 into the SH_DICT dictionary. Since the string beginning with the primary character "A," the ambiguity resolution logic only looks at the word grouping with the grouping label 100 that matches "A_SH_DICT." The ambiguity resolution logic then searches this grouping for a match between the character string "aorribe" and the set of index words 101 within that grouping. Since such an entry exists, the ambiguity resolution logic displays the matched word 102 that has the character string "ascribe."

Referring to FIG. 15, an overall block diagram of the process for creating the SH_DICT dictionary is shown. The purpose of this process is to establish a database of word pair entries organized into fourteen word groupings as set forth in the preceding discussion.

The process for creating the SH_DICT dictionary begins with the user creating an input file 105 comprising correctly spelled words that are to be recognized by the basic ambiguity resolution logic. The input file 105 is read by the CREATE_SH_DICT routine 106, which calls the SHKB_CONV routine 107 to transform the spelling of each word into a spelling comprising exclusively primary characters. The CREATE_SH_DICT routine 106 then writes the resultant word pair entry to the SH_DICT dictionary 108.

Referring to FIG. 16, a flow diagram for the CREATE_SH_DICT routine 106 is illustrated. The purpose of this routine is to transform each word occurring in the input file 105 into the set of word pair entry groupings, one grouping for each primary character, as contained in the SH_DICT dictionary 108. Each word occurring in the input file 105 is converted into a spelling comprising only primary characters.

The routine begins by opening the input file 105 (block 110) containing the words to be used by the basic ambiguity resolution logic. The routine then reads the first word in the input file 105 (block 111) and calls the SHKB_CONV 107 to convert the spelling of the input word into exclusively primary characters (block 112). The SHKB_CONV routine 107 stores the converted input word in a temporary buffer. The routine then creates a word pair entry in the SH_DICT dictionary 108 comprising a grouping label 100 associated with a word pair comprising the index word 101 and the matched word 102. Recall that the indexed word 101 is made up of primary characters exclusively and the matched word 102 corresponds to the input word as read in from the input file 105 (block 113). If the routine has reached the end of the input file 105 (block 114), no words remain in the input file 105 and the routine terminates (block 116). Otherwise, the CREATE_SH_DICT routine 106 gets the next word in the input file 105 (block 115) and the conversion process continues anew.

Figure 17:
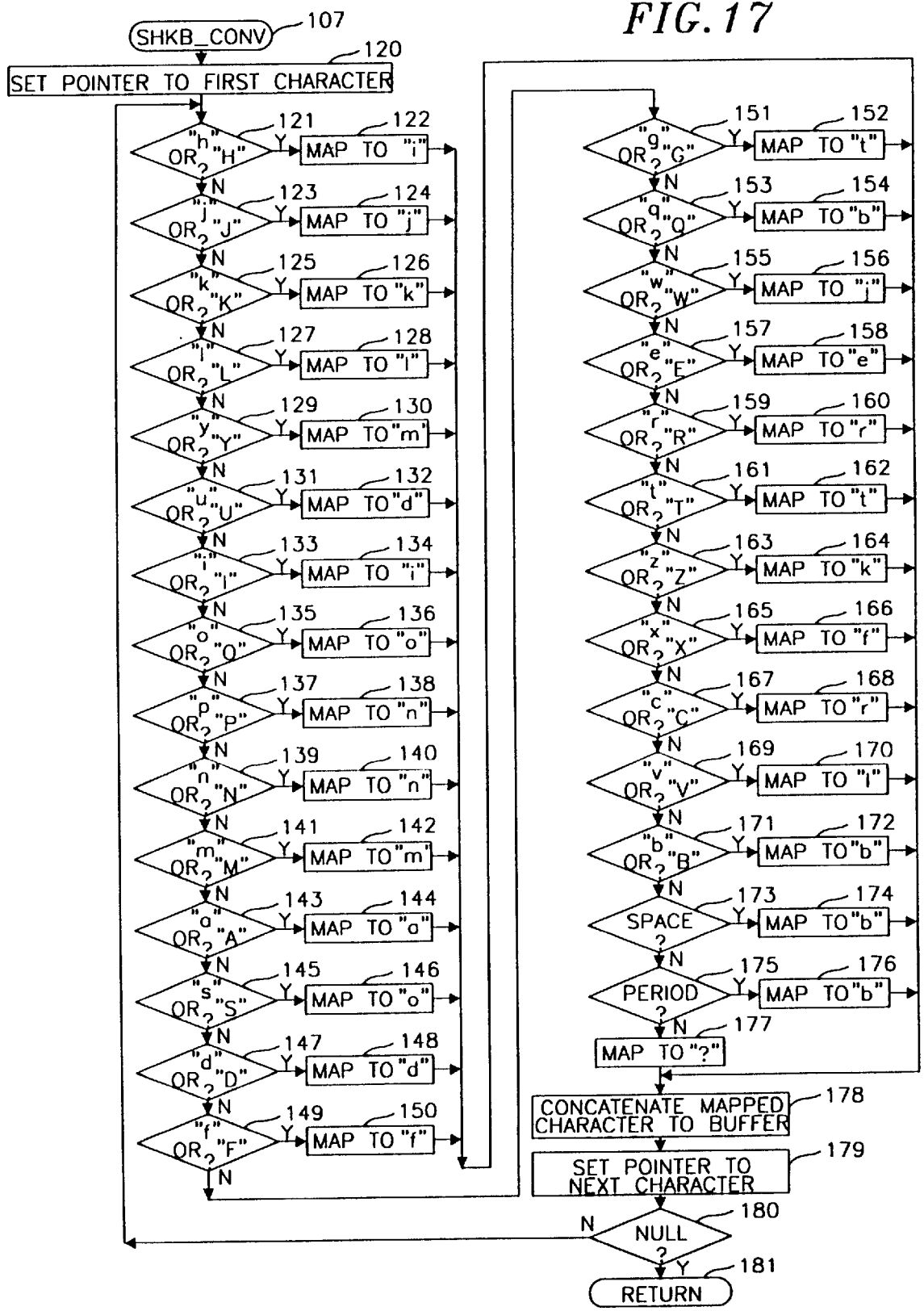
FIG. 17 is a flow diagram of the SHKB_CONV routine of FIG. 15.

Referring to FIG. 17, a flow diagram for the SHKB_CONV routine 107 is illustrated. The purpose of this routine is to convert a single input word into an output word stored in a temporary buffer that is spelled only with primary characters.

The SHKB_CONV routine 107 begins by accepting an input word and setting an internal pointer to the first character of that word (block 120). The routine then parses the input word one character at a time and converts each character into a primary character. If the current character is already a primary character (blocks 123, 125, 127, 133, 135, 139, 141, 143, 147, 149, 157, 159, 161 and 171), the character is mapped to a lower case representation of that primary character (blocks 124, 126, 128, 134, 136, 140, 142, 144, 148, 150, 158, 160, 162 and 172). Otherwise, the current input character is an alternate character (block 121, 129, 131, 137, 145, 151, 153, 155, 163, 165, 167 and 169) and is mapped to the lower case representation of the primary character assigned thereto (block 122, 130, 132, 138, 146, 152, 154, 156, 164, 166, 168 and 170).

The SHKB_CONV routine 107 also handles two special cases. First, if the current input character is a space (block 173), the character is mapped to a lower case B (block 174). Second, if the input character is a period (block 175), the character is also mapped to a lower case B (block 176). Otherwise, if the current input character is neither a primary or alternate character, nor a space or period, the character is mapped to a question mark (block 177).

Regardless of the result of the mapping process, the routine concatenates the mapped character to the temporary buffer (block 178) and increments the internal pointer to the next character of the input word (block 179). The routine assumes that every input word is null terminated, therefore, if the next input character is a null character (block 180), the end of the word has been reached and routine returns the converted word in the temporary buffer (block 181). Otherwise, the routine begins the parsing process anew.

2. DICT Dictionary The purpose of the DICT dictionary is to provide a database that supplies an additional level of functionality to the basic ambiguity resolution logic. Referring to FIG. 18a, a diagram depicting an excerpt of the DICT dictionary is illustrated. It comprises a set of entries which include an index word 184 and a list 185. The index word 184 is a correctly spelled word. As a result, the DICT dictionary is only used by the enhanced ambiguity resolution logic after the initial input word ambiguity has been resolved. The list 185 comprises one or more words corresponding to alternate spellings of the index word 184, that is, alternate characters are substituted for one or more of the characters comprising the index word 184.

Referring to FIG. 18b, a diagram depicting an excerpt of an alternate embodiment of the DICT dictionary is shown. Rather than using the approach taken in the preferred embodiment, the alternate embodiment shown "flattens out" the list 185 by creating word-pair entries structured similarly to the SH DICT dictionary 108 (see FIG. 14). Consequently, multiple entries may be present in the DICT dictionary which use the same index word 184 yet have a different matched word 186, each such matched word 186 comprising one of the words found in the list 185.

Figure 19:
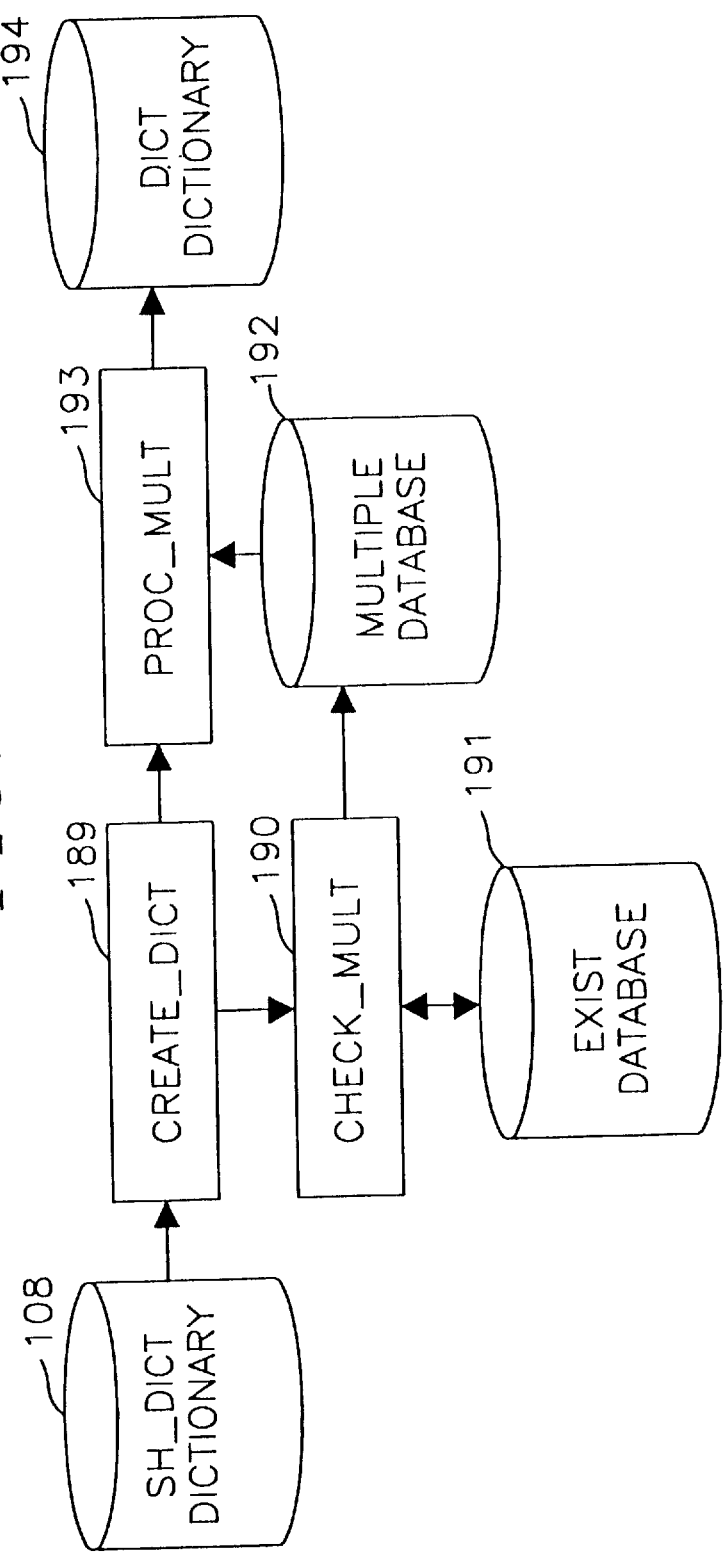
FIG. 19 is a block diagram depicting a process for creating the DICT dictionary.

Referring to FIG. 19, an overall block diagram of the process for creating the DICT dictionary is illustrated. The CREATE_DICT routine 189 reads the set of word pair entries stored in the SH_DICT dictionary 108. It then iteratively calls the CHECK_MULT routine 190, one call for each primary character. In turn, the CHECK_MULT routine 190 records each entry from the SH_DICT dictionary 108 in a temporary database called the EXIST database 191. The CHECK_MULT routine 190 checks if multiple index words occur in the SH_DICT dictionary 108 and records every multiple occurrence in another temporary database, the MULTIPLE database 192. After the SH_DICT dictionary 108 has been processed, the CREATE_DICT routine 189 calls the PROC_MULT routine 193. That routine reads each entry in the MULTIPLE database 192 and consolidates each multiple entry into a single entry that it stores into the DICT dictionary 194.

Figure 20:
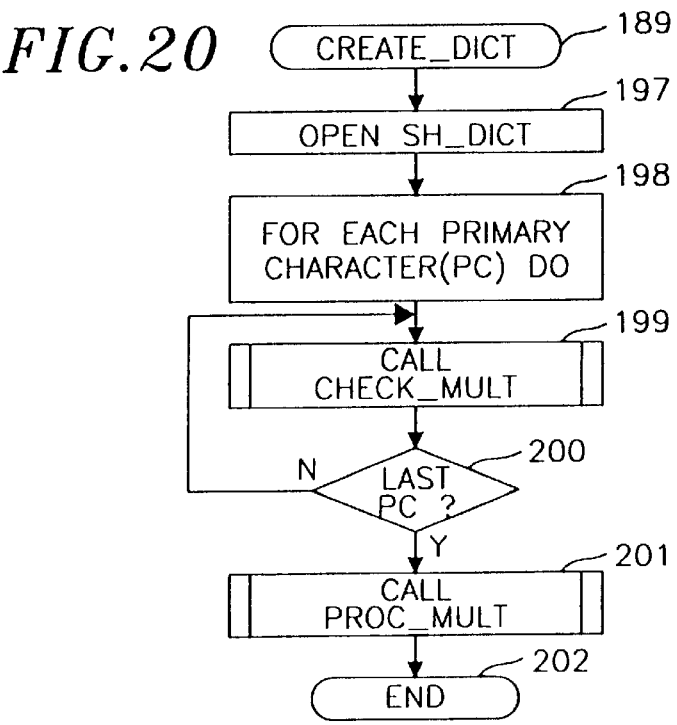
FIG. 20 is a flow diagram of the CREATE_DICT routine of FIG. 19.

Referring to FIG. 20, a flow diagram for the CREATE_DICT routine 189 is illustrated. The purpose of this routine is to process each of the groupings of word pair entries stored in the SH_DICT dictionary 108 for duplicate entries.

The routine begins by opening the SH_DICT dictionary 108 for reading (block 197). The routine then iteratively calls the CHECK_MULT routine 190, one call for each primary character (block 198). The CHECK_MULT routine 190 analyzes the word grouping for the current primary character (block 199) and repeats the process until the last primary character has been processed (block 200). Once completed, the CREATE_DICT routine 189 calls the PROC_MULT routine 193 to process any multiple entries detected in the SH_DICT dictionary 108 (block 201) and terminates (block 202).

Figure 21:
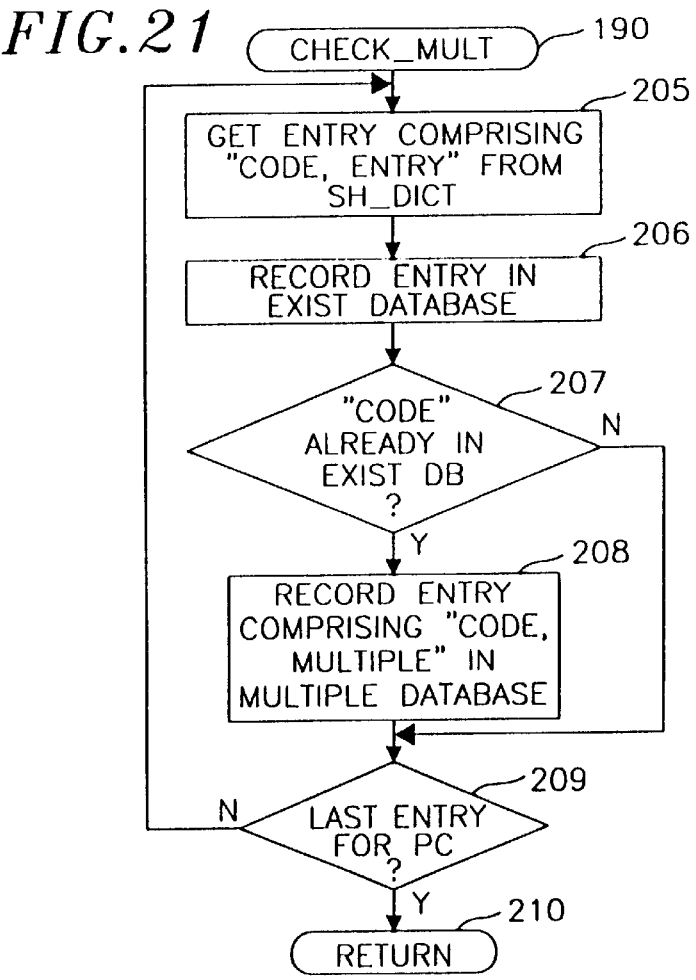
FIG. 21 is a flow diagram of the CHECK_MULT routine of FIG. 19.

Referring to FIG. 21, a flow diagram for the CHECK_MULT routine 190 is illustrated. A purpose of this routine is to detect duplicate entries in the SH_DICT dictionary 108 and to record them for processing by the PROC_MULT routine 193.

The CHECK_MULT routine 190 begins by retrieving a word pair entry from the SH_DICT dictionary 108 (block 205). The routine uses the variable CODE to store the first (index) word comprising the word pair and the variable ENTRY to store the second (matched) word in the word pair. The word pair entry is recorded in a temporary database, the EXIST database 191 (block 206).

Next, the routine performs a look up to the EXIST database 191 using the current index word as stored in the variable CODE to see if a duplicate entry exists in the EXIST database 191 (block 207). If a duplicate entry is detected, the CHECK_MULT routine 190 records that entry in another temporary database, the MULTIPLE database 192 (block 208). The routine uses the variable MULTIPLE to store the duplicate matched word. The process of retrieving an entry from the SH_DICT dictionary 108 and searching the EXIST database 191 for duplicate entries continues until the last entry for the current primary character is encountered (block 209), whereupon the routine returns (block 210).

Figure 22:
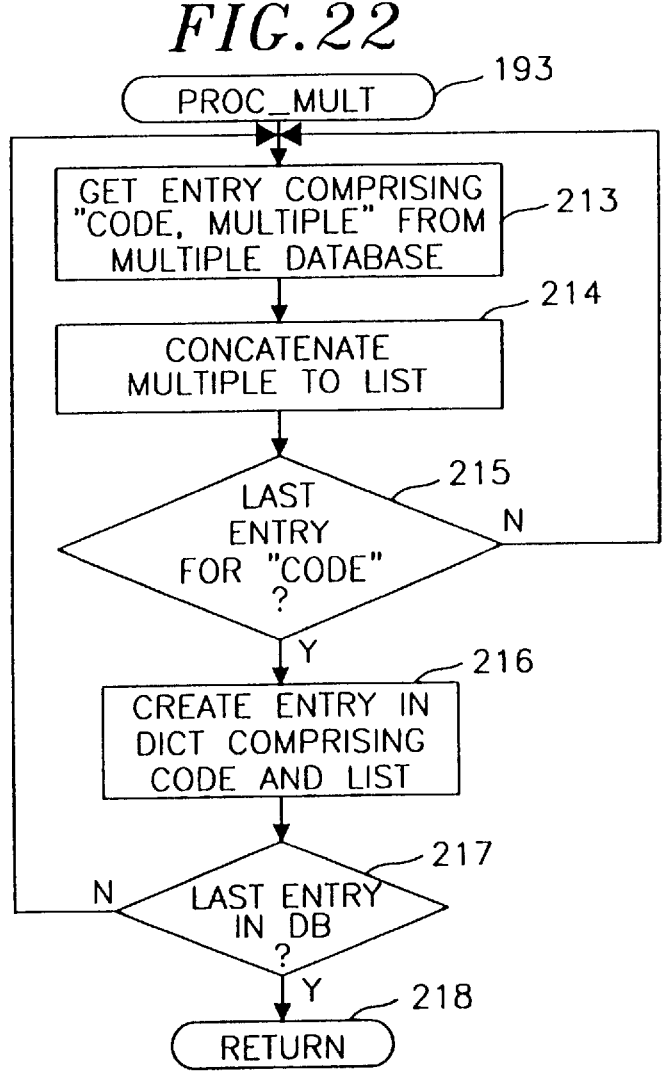
FIG. 22 is a flow diagram of the PROC_MULT routine of FIG. 19.

Referring to FIG. 22, a flow diagram for the PROC_MULT routine 193 is illustrated. The purpose of this routine is to process each duplicate entry as recorded in the MULTIPLE database 192 and to write a consolidated entry into the DICT dictionary 194.

The PROC_MULT routine 193 begins by retrieving an entry from the MULTIPLE database 192 (block 213). It then concatenates the second entry from the word pair to the variable LIST (block 214). The routine continues to process all duplicate entries indexed under the same index word (as stored in the variable CODE) until the last entry has been encountered (block 215).

After all entries for the same index word are processed, the PROC_MULT routine 193 writes an entry into the DICT dictionary 194 comprising the index word and the list of duplicate entries corresponding to that index code word (block 216). When the last entry in the MULTIPLE database 192 has been processed (block 217), the routine returns (block 218).

III. Software Emulator and Hardware Embodiment

One embodiment of a single-hand keyboard comprises a software emulator operating on a conventional personal computer to transform a conventional full keyboard into a single-hand keyboard. Another embodiment comprises a dedicated single-hand keyboard similar to a personal data assistant.

A. Software Emulator

One embodiment of the single-hand keyboard is an emulator which uses a personal computer program with a computer program to map the keys on a full, conventional two-handed keyboard for single handed use. This enables a user to transform a full keyboard into either the right-handed single-hand keyboard 5 or left-handed single-hand keyboard 7. There are several applications of the emulator including use as a test bed, for training purposes, or use to enable single-handed typing to free the other hand for operations such as holding a telephone handset.

Figure 23A:
FIGS. 23a and 23b are plan views depicting the key layout of a conventional two-handed keyboard converted for single-hand use by a programmed computer (Prior Art). A right-handed keyboard is depicted in FIG. 23a and a left-handed keyboard is depicted in FIG. 23b.
Figure 23B:
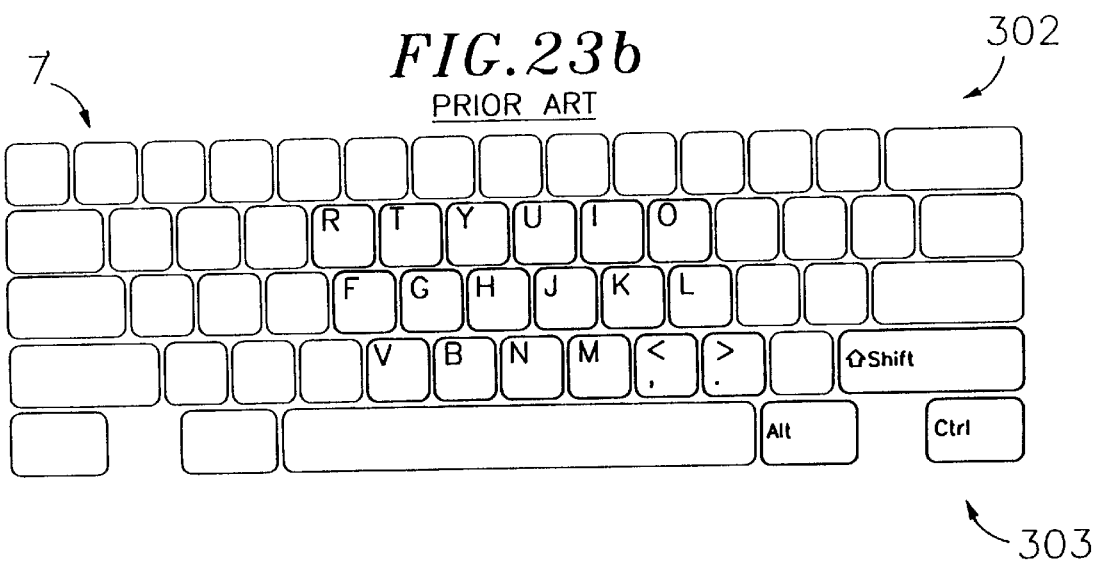

The software emulator utilizes a subset of the keys found on a conventional prior art full keyboard. Referring to FIG. 23a, the key layout of a conventional keyboard 300 indicating in heavy lines the keys 301 for a right-handed single-hand keyboard 5' is shown. Similarly, referring to FIG. 23b, the key layout of a conventional prior art keyboard 302 indicating in heavy lines the keys 303 for a left-handed single-hand keyboard 7' is shown.

Figure 24:
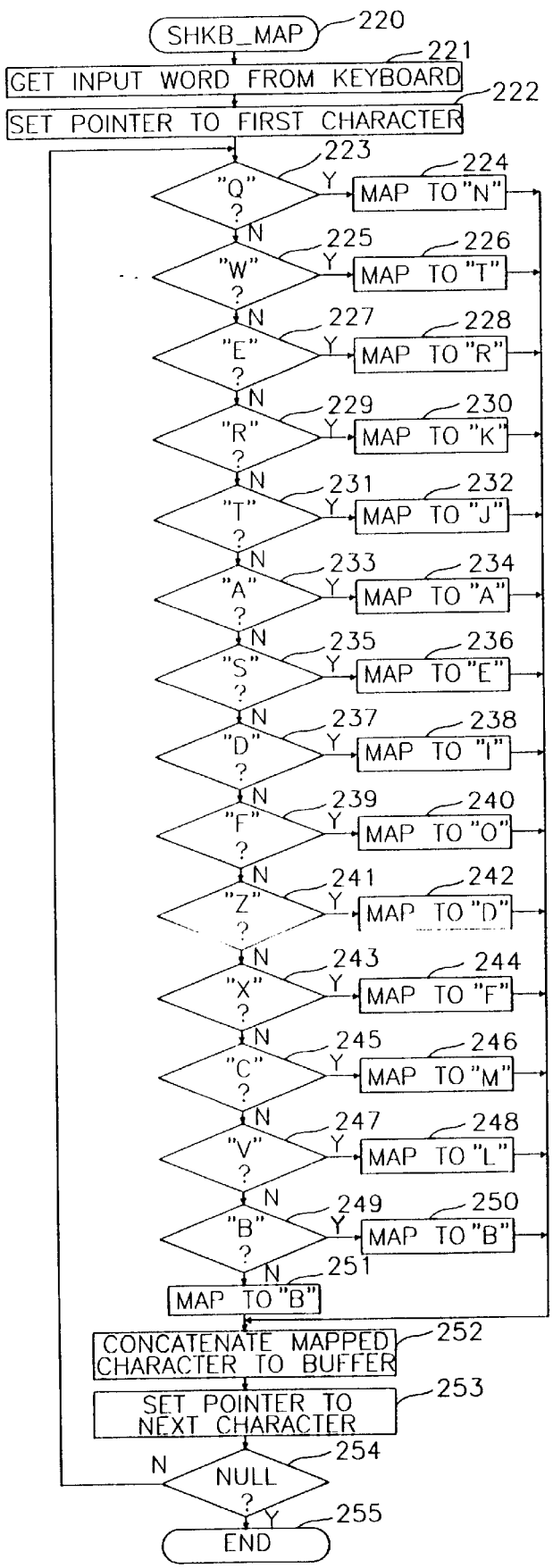
FIG. 24 is a flow diagram of SHKB_MAP routine of a computer program for use in the programmed computer referred to in the description of FIG. 23 for emulating a single-handed keyboard using the conventional two handed keyboard.

Referring to FIG. 24, a flow diagram for a SHKB_MAP computer program routine 220 is illustrated. The purpose of this routine is to map the raw signals (representative of the keys that are entered) output from a full keyboard and keyboard controller using a conventional personal computer. The mapping is done in a manner that emulates a single-hand keyboard. Although the SHKB_MAP routine 220 as depicted in FIG. 24 is for a right-handed single-hand keyboard 5', it will be obvious to one skilled in the art as to how to modify this routine to function as an emulator for a left-handed single-hand keyboard 7'.

The SHKB_MAP routine 220 is designed to operate as a driver program. Consequently, it interfaces directly to the hardware and would be transparent to the ambiguity resolution logic. The SHKB_MAP routine 220 begins by getting an input word from the keyboard (block 221) and setting an internal pointer to the first character in that input word (block 222). The routine then parses that raw input character (blocks 223, 225, 227, 229, 231, 233, 235, 237, 239, 241, 243, 245, 247, and 249) and maps it to one of the 14 primary characters recognized by the single-hand keyboard (blocks 224, 226, 228, 230, 232, 234, 236, 238, 240, 242, 244, 246, 248, and 250). If the raw input character is not recognized, the SHKB_MAP routine 220 maps that character to the character B (block 251).

The routine concatenates the mapped character to a temporary input buffer (block 252) and increments the internal pointer to the next character in the input word (block 253). The routine assumes that the input word is null terminated and when the null character is detected (block 254), the routine returns the mapped input word to the ambiguity resolution logic and terminates (block 255).

B. Dedicated Single-Hand Keyboard

Figure 25:
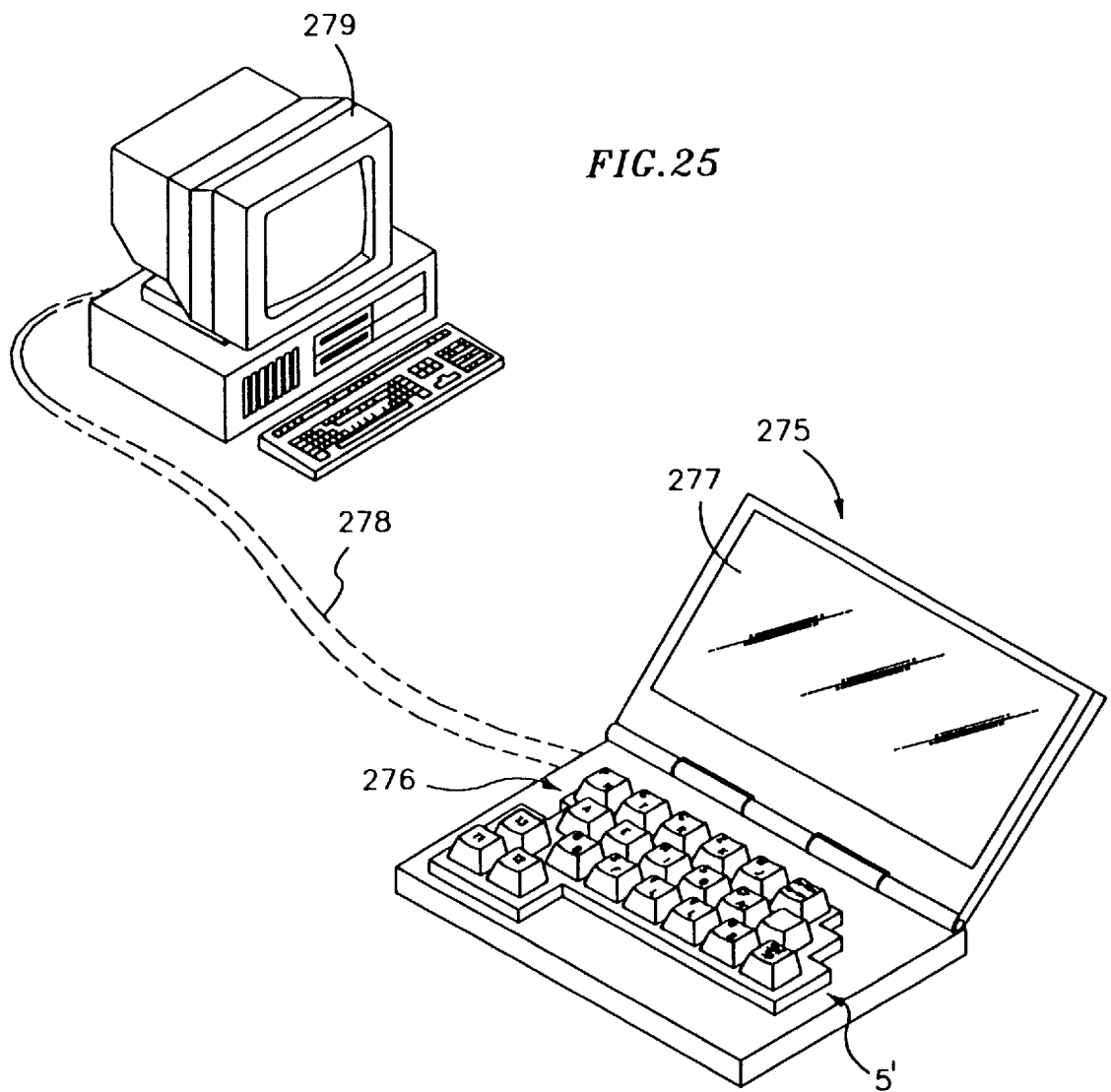
FIG. 25 is a perspective view of the dedicated single-hand keyboard corrected as an input device to a personal computer.

FIG. 25 discloses a keyboard entry system which includes dedicated single-hand keyboard 5' and display screen 277 that can be held in the palm of a person's hand. The keyboard entry system 275 communicates via electronic interface 278 to personal computer 279.

The keyboard 5' comprises finger keys and thumb keys 276 that are essentially the same as that of keyboard 5 of FIG. 2 except as discussed below. An electronic interface (not shown) located inside the cabinet of dedicated single-hand keyboard 5'is a conventional RS-232C or RS-422 serial connection, a dedicated bus interface, a wireless interface, a PCMCIA interface, a standard 5-wire DIN keyboard interface, or a row/column interface to interface with personal computer 279. The foregoing list of interface devices is not meant as a limitation and other interfaces could be employed within the spirit of the subject invention.

As the keys are entered on keyboard 5', as discussed with reference to keyboard 5, the characters that are generated are displayed on the display screen 277 in a conventional manner well known in the art of laptop computers. This enables the user to see the sequence of characters that are being generated as a sequence of keys is entered. This enables the user to use the CTVi key to change characters from a primary to a secondary character assigned to a multiple-character key that is being entered or, after a sequence of keys have been entered, to enter the Ar key to change the sequence of characters using the ambiguity resolver while viewing the sequence of characters on the display screen 277. The resultant sequence of generated characters can then be sent to computer 279.

FIG. 26 depicts a schematic and block diagram of a single-hand keyboard entry system 275. The keypad 276, which includes the keys of one of the single-hand keyboards described above or a conventional two-hand keyboard with character mapping to a single-hand keyboard as shown in FIG. 24. The keys are related through key switches (not shown), to dedicated keyboard controller 285 which transmits a scan code signal to the microprocessor 286. The microprocessor 286, under computer program control, carries out the character generation and implements ambiguity resolution as described above and transmits the words or sequences of characters in their final, correctly spelled and in unambiguous form to the personal computer 279 (FIG. 25).

The dedicated single-hand keyboard system 275 is self-powered by battery pack 287 which is controlled by on/off switch 288 and supplies power for the entire keyboard system 275. A reset button 289 is provided to reset the microprocessor 286 in the event of a computer program failure or user intervention. The microprocessor 286 echoes the keys entered by the user on the display screen 277. In the preferred embodiment, the display screen 277 is a 40 column by 20 row liquid crystal diode display.

Communication to the personal computer 279 is via the electronic interface 278 which is connected to the microprocessor 286. An optional interface is the PCMCIA interface 290 containing a two megabyte (MB) memory card. By way of example, the microprocessor 286 is equipped with two external memory stores, the random access memory (RAM) 291 and the read-only memory (ROM) 292; both the RAM 291 and the ROM 292 have 2MB capacities and the ROM 292 is dedicated to storing the operating system for the dedicated single-hand keyboard.

In one embodiment of the dedicated single-hand keyboard system 275, the microprocessor 286 is an Intel 80286-compatible microprocessor with a clock speed of 8 MHz or faster. Additionally, the preferred operating system for the microprocessor is MS-DOS Version 5.0 or higher. Such an embodiment of the invention could be incorporated into a word processing system or as a PDA. The character generator and the ambiguity resolver can be incorporated into or used with a word processor. Also, the keyboard and switches of FIG. 26 can be in one unit, and the rest of the system can be part of a computer where the display is part of the keyboard unit or in the computer.

While the invention has been particularly shown and described with reference to the preferred embodiments thereof, it will be understood by those skilled in the art that the foregoing and other changes in form and detail may be made therein without departing from the spirit and scope of the invention.

What is claimed is:

1. A keyboard for operation by fingers of a single hand of a person and comprising character keys, each of which when operated enables generation of an assigned character, the keyboard comprising:

a first bank of the keys comprising at least one said key assigned the characters n and p and at least one said key assigned the characters t and g disposed for operation by the index finger, at least one said key assigned the characters r and c disposed for operation by the middle finger, at least one said key assigned the characters k and z disposed for operation by the ring finger, and at least one said key assigned the characters j and w disposed for operation by the little finger of the single hand;

a second bank of the keys comprising at least one said key assigned the characters d and u and at least one said key assigned the characters f and x disposed for operation by the index finger, at least one said key assigned the characters m and y disposed for operation by the middle finger, at least one said key assigned the characters l and v disposed for operation by the ring finger, and at least one said key assigned the characters b and q disposed for operation by the little finger of the single hand; and a middle bank of the keys between the first and second banks comprising at least one said key assigned the character a and at least one said key assigned the character e disposed for operation by the index finger, at least one said key assigned the characters i and h disposed for operation by the middle finger, at least one said key assigned the characters o and s disposed for operation by the ring finger of the single hand.

2. A keyboard as in claim 1 wherein the keyboard further comprises keyboard function keys disposed for operation by a finger of the single hand, the first bank further comprising at least one keyboard function key operable in the keyboard for control of capitalization of the character being generated and disposed for operation by said little finger.

3. A keyboard as in claim 1 wherein the keyboard further comprises keyboard function keys disposed for operation by a finger and said middle bank further comprises at least one keyboard function key disposed for operation by said little finger for causing resolution of the ambiguity between the generated characters when, during operation of a plurality of the keys, one of the character keys is operated that is assigned at least two characters.

4. A keyboard as in claim 1 wherein the second bank comprises at least one keyboard function key for entry of a space character between said characters being generated, said at least one keyboard function key being disposed for operation by said little finger.

5. A keyboard as in claim 1 comprising a secondary bank of keys disposed for operation by a thumb of the single hand for control of the keyboard.

6. A keyboard as in claim 1 wherein the keys are arranged in substantially parallel rows and diagonal columns, the diagonal columns comprising:

a first diagonal column comprising the keys assigned the characters n, p, a, d and u;

a second diagonal column comprising the keys assigned the characters t, g, e, f and x;

a third diagonal column comprising the keys assigned the characters r, c, i, h, m and y;

a fourth diagonal column comprising the keys assigned the characters k, z, o, s, l and v; and a fifth diagonal column comprising the keys assigned the characters j, w, b and q.

7. A keyboard as in claim 6 comprising a sixth diagonal row which comprises at least one function key disposed for operation by said little finger for causing resolution of the ambiguity between the characters to be generated when one of the character keys is operated that is assigned at least two characters.

8. A keyboard for entering, with the fingers of a single hand, the letters of the alphabet, the keyboard having first, second and middle rows of letter entry keys, the middle row being located between the first and second rows, the keyboard comprising:

the letter entry keys of the middle row comprising a key assigned character "a", a key assigned character "e", a key assigned characters "i" and "h", and a key assigned characters "o" and "s";

the letter entry keys of the first row comprising a key assigned characters "n" and "p", a key assigned characters "g" and "t", a key assigned characters "c" and "r", a key assigned characters "z" and "k", and a key assigned characters "w" and "j"; and the letter entry keys of the second row comprising a key assigned characters "d" and "u", a key assigned characters "f" and "x", a key assigned characters "m" and "y", a key assigned characters "l" and "v", and a key assigned characters "b" and "q".

9. A keyboard as in claim 8 comprising a representation of each of the letters displayed in association with the corresponding key.

10. A keyboard as in claim 9 wherein each said representation of each letter is on the corresponding key.

11. A keyboard as in claim 8 comprising a bank of keys disposed for operation by a thumb of the single hand for control of the keyboard.

12. A keyboard as in claim 8 wherein the keys are arranged in substantially parallel rows and diagonal columns, the diagonal columns comprising:

a first said diagonal column comprising the n, p, a, d and u keys;

a second said diagonal column comprising the t, g, e, f and x keys;

a third said diagonal column comprising the r, c, i, h, m and y keys;

a fourth said diagonal column comprising the k, z, o, s, l and v keys; and a fifth diagonal column comprising the j, w, b and q keys.

13. A keyboard as in claim 12 wherein the keyboard also comprises keyboard control keys and wherein the fifth diagonal column and the middle row comprises a function key and a representation "Ar" displayed in association with said control key.

14. A keyboard character entry system comprising:

a plurality of keys, the keys comprising a plurality of single character keys, each single character key representing one character, and a plurality of multiple character keys, each multiple character key representing at least two characters;

means for generating, upon entry of a sequence of keys, a sequence of characters assigned to the sequence of entered keys, wherein an ambiguity exists among the multiple characters assigned to multiple character keys entered as to correct assigned characters that are to be included in the sequence of characters means for resolving the ambiguity by matching the sequence of characters to either a word or a predefined mnemonic, said predefined mnemonic being linked to a character string of at least one character;

wherein the sequence of characters has a beginning and an end, with a first character at the beginning of the sequence of characters and a last character at the end of the sequence of characters, the first character and the last character each forming a terminus of the sequence of characters, and the means for resolving the ambiguity further comprises:

means operative if the sequence of characters is not matched to either said word or said predefined mnemonic for comparing a subsequence of characters of the sequence of characters, the subsequence of characters including at least one terminus of the sequence of characters, with at least one predefined set of characters, each at least one predefined set of characters comprising at least one character;

means operative if the sequence of characters is not matched to either said word or said predefined mnemonic for creating a root sequence of characters by deleting the subsequence of characters from the sequence of characters if the subsequence of characters matches one of the at least one predefined set of characters; and means for further resolving the ambiguity by matching the root sequence of characters to either said word or said predefined mnemonic.

15. A keyboard character entry system as in claim 14 wherein the generating means comprises a processor.

16. A keyboard character entry system as in claim 15 wherein the processor comprises a programmed computer.

17. A keyboard character entry system as in claim 14 further comprising a display for displaying to a user the sequence of characters assigned to the entered keys.

18. A keyboard character entry system as in claim 17 further comprising a buffer for storing the sequence of characters for the display.

19. The keyboard character entry system of claim 14 wherein said predefined mnemonic is linked to a punctuation character.

20. The keyboard character entry system of claim 14 wherein said word or said predefined mnemonic comprises an index word linked to at least one other word, and further comprising means for displaying to the user the index word and the at least one other word.

21. The keyboard character entry system of claim 20 wherein the at least one other word is a verb tense variation of the index word.

22. The keyboard character entry system of claim 20 wherein the at least one other word is a user defined character string.

23. A method for generating character sequences using a keyboard character entry system having keys and a character generator, wherein the keys are each assigned at least one character, and at least one of the keys is a multiple character key assigned multiple characters, the method comprising the steps of:

generating upon entry of a sequence of keys, a sequence of characters comprising a character assigned to each key in the sequence of keys, there being an ambiguity among the multiple characters assigned to a multiple character key that is entered as to a correct assigned character that is to be included in the sequence of characters;

resolving the ambiguity by matching the sequence of characters to either a word or a predefined mnemonic, said predefined mnemonic being linked to a character string of at least one character;

wherein the sequence of characters has a beginning and an end, with a first character at the beginning of the sequence of characters and a last character at the end of the sequence of characters, the first character and the last character each forming a terminus of the sequence of characters, and the step of resolving the ambiguity further comprises:

comparing, when the sequence of characters is not matched to either said word or said predefined mnemonic, a subsequence of characters of the sequence of characters, the subsequence of characters including at least one terminus of the sequence of characters, with at least one predefined set of characters, each at least one predefined set of characters comprising at least one character; and creating, when the sequence of characters is not matched to either said word or said predefined mnemonic, a root sequence of characters by deleting the subsequence of characters from the sequence of characters if the subsequence of characters matches one of the at least one predefined set of characters; and further resolving the ambiguity by matching the root sequence of characters to either said word or said predefined mnemonic.

24. The method of claim 23 wherein the step of resolving an ambiguity is performed using a processor.

25. The method of claim 23 wherein the step of resolving an ambiguity is performed using a programmed computer.

26. The method of claim 23 further comprising storing the sequence of characters in a buffer.

27. The method of claim 26 further comprising:

storing the sequence of characters in a buffer.

28. The method of claim 23 wherein said predefined mnemonic is linked to a punctuation character.

29. The method of claim 23 wherein said word or said predefined mnemonic comprises an index word linked to at least one other word, and further comprising the step of displaying to the user the index word and the at least one other word.

30. The method of claim 29 wherein the at least one other word is a verb tense variation of the index word.

31. The method of claim 29 wherein the at least one other word is a user defined character string.

32. A keyboard for resolving ambiguities in words entered in the keyboard comprising:

a plurality of keys, the keys being assigned at least one character and at least one key being assigned a plurality of characters;

a character buffer for storing a plurality of character keycodes;

logic for obtaining a character keycode from a selected one of the plurality of keys;

logic for returning a word corresponding to contents of the character buffer when the character keycode corresponds to a carriage return key;

logic for truncating the contents of the character buffer by one character when the character keycode corresponds to a backspace key;

logic for setting the contents of the character buffer to a null string when the character keycode corresponds to an escape key;

logic for performing ambiguity resolution on the contents of the character buffer when the character keycode corresponds to an ambiguity resolution key;

logic for storing the character keycode in the character buffer when the character keycode does not correspond to a carriage return key or a backspace key or an escape key or an ambiguity resolution key;

a random-access memory;

a dictionary stored in the random-access memory;

logic for performing ambiguity resolution comprising:
   logic for matching contents of the character buffer to a word in the dictionary;
   logic for processing word variations when no match is found;
   logic for substituting the contents of the character buffer with a terminal symbol when a match is found and the word corresponds to a predetermined mnemonic character string of at least two characters;
   logic for performing enhanced ambiguity resolution when no match is found or when a match is found but the word does not correspond to the predetermined mnemonic character string of at least two characters;
   means for displaying the word matched in the dictionary when a match is found; and
   logic for prompting the user to select the word.

33. A keyboard character entry system comprising:

a plurality of keys, the keys comprising a plurality of single character keys, each single character key representing one character, and a plurality of multiple character keys, each multiple character key representing at least two characters;

means for generating, upon entry of a sequence of keys, a sequence of characters assigned to the sequence of entered keys, wherein an ambiguity exists among the multiple characters assigned to multiple character keys entered as to correct assigned characters that are to be included in the sequence of characters;

means for resolving the ambiguity by matching the sequence of characters to either a word or a predefined mnemonic, said predefined mnemonic being linked to a character string of at least one character;

means for forming a list of character sequences comprising the sequence of characters with the first character in the sequence capitalized, the sequence of characters with all of the characters in the sequence capitalized, and the sequence of characters with none of the characters in the sequence capitalized; and means for selecting one of the character sequences in the list.

34. A method for generating character sequences using a keyboard character entry system having keys and a character generator, wherein the keys are each assigned at least one character, and at least one of the keys is a multiple character key assigned multiple characters, the method comprising the steps of:

generating upon entry of a sequence of keys, a sequence of characters comprising a character assigned to each key in the sequence of keys, there being an ambiguity among the multiple characters assigned to a multiple character key that is entered as to a correct assigned character that is to be included in the sequence of characters;

resolving the ambiguity by matching the sequence of characters to either a word or a predefined mnemonic, said predefined mnemonic being linked to a character string of at least one character comprising:
   forming a list of character sequences comprising the sequence of characters with the first character in the sequence capitalized, the sequence of characters with all of the characters in the sequence capitalized, and the sequence of characters with none of the characters in the sequence capitalized; and
   selecting one of the character sequences in the list.

\* \* \* \* \*